(12) United States Patent
Okazaki et al.

(10) Patent No.: US 9,394,021 B2
(45) Date of Patent: Jul. 19, 2016

(54) CONVEYANCE DEVICE

(71) Applicant: NAKANISHI METAL WORKS CO., LTD., Osaka-shi, Osaka (JP)

(72) Inventors: Yoshihiro Okazaki, Osaka (JP); Ryoichi Kitaguchi, Osaka (JP)

(73) Assignee: NAKANISHI METAL WORKS CO., LTD., Osaka-shi (JP)

( * ) Notice: Subject to any disclaimer, the term of this patent is extended or adjusted under 35 U.S.C. 154(b) by 0 days.

(21) Appl. No.: 14/879,424

(22) Filed: Oct. 9, 2015

(65) Prior Publication Data

US 2016/0107711 A1    Apr. 21, 2016

(30) Foreign Application Priority Data

Oct. 16, 2014    (JP) .................................. 2014-211553

(51) Int. Cl.
*B65G 35/06* (2006.01)
*B62D 65/18* (2006.01)
*B65G 17/06* (2006.01)

(52) U.S. Cl.
CPC .............. *B62D 65/18* (2013.01); *B65G 17/066* (2013.01); *B65G 35/06* (2013.01)

(58) Field of Classification Search
CPC .... B65G 35/06; B65G 17/066; B65G 17/068; B65G 17/02; B62D 65/18; B62D 17/42
USPC .................................................... 198/867.13
See application file for complete search history.

(56) References Cited

U.S. PATENT DOCUMENTS

| 2,689,638 | A | * | 9/1954 | Mojonnier | B65B 35/24 198/831 |
| 3,379,300 | A | * | 4/1968 | Karr | B65G 17/066 198/321 |
| 5,201,407 | A | * | 4/1993 | Proske | B65G 23/14 198/833 |
| 5,394,978 | A | * | 3/1995 | Majewski, Sr. | B65G 23/16 198/831 |
| 2006/0157320 | A1 | * | 7/2006 | Spoeler | B62D 65/18 198/463.1 |

FOREIGN PATENT DOCUMENTS

JP    2007-526861 A    9/2007
JP    2013-107731 A    6/2013

* cited by examiner

*Primary Examiner* — Mark A Deuble
(74) *Attorney, Agent, or Firm* — Kratz, Quintos & Hanson, LLP

(57) ABSTRACT

There is provided a conveyance device that can convey a conveyance truck composed of two truck bodies on which a worker rides and does a work in a widthwise direction of a large conveyance object, using a friction type drive unit disposed on a linear route or a curved route, which can improve workability and reduce manufacturing cost.

A conveyance device includes a connecting device C for connecting conveyance trucks 1 on front and rear positions. Each of the trucks 1 is configured so that a first truck body 1A whose front and rear end surfaces are arc-shaped projections in plan view and a second truck body 1B whose front and rear end surfaces are arc-shaped recesses in plan view are connected to be capable of curving in a horizontal direction, and upper surfaces of the first truck body 1A and the second truck body 1B are approximately horizontal surfaces. Portions of the second truck body 1B that are radially inside a curved route and forms the arc-shaped recesses are composed of oscillation piece 2 as mobile bodies that make side surfaces of the first truck body 1A and the second truck body 1B approximately linear on a linear route and touch the side surface of the first truck body 1A to move on the curved route.

4 Claims, 18 Drawing Sheets

CONVEYANCE DEVICE

The present invention claims priority to Japanese Application No. 2014-211553, filed Oct. 16, 2014, which is incorporated herein by reference.

TECHNICAL FIELD

The present invention relates to a conveyance device that conveys a non-self-propelled conveyance truck loaded with a conveyance object along a conveyance route including a curved route, and can form a floor continuous with the conveyance truck on an entire or a part of the conveyance route.

BACKGROUND ART

A conveyance device that can convey a non-self-propelled conveyance truck loaded with a conveyance object along a conveyance route including a curved route and can form a floor continuous with the conveyance truck on an entire or a part of the conveyance route has the following constitution. Four truck bodies (a first truck body 1A, a second truck body 1B, a first connecting truck body 2A and a second connecting truck body 2B) are connected with each other with the truck bodies being capable of curving so as to constitute a conveyance truck 1. A plurality of conveyance trucks 1 is connected by a connecting unit C so as to form a conveyance truck group A, a conveyance object W is supported by the first truck body 1A, and upper surfaces of the truck bodies 1A and 1B and upper surfaces of the connecting truck bodies 2A and 2B are on the same horizontal plane (see Patent Document 1).

Further, as the conveyance device, there exists a conveyance device having the following constitution. Supporting elements 2 whose both front and rear end surfaces in a conveyance direction are arc-shaped protrusions in plan view, and intermediate elements 8 whose both front and rear end surfaces in the conveyance direction are arc-shaped recesses in plan view are disposed alternately and are connected with them being capable of curving so as to form an assembly/conveyance belt 1 that circulates along a closed route. The supporting elements 2 support a conveyance object, and upper surfaces of the supporting elements 2 and upper surfaces of the intermediate elements 8 are on an approximately same horizontal plane (see Patent Document 2).

CITATION LIST

Patent Literatures

Patent Document 1: JP-A No. 2013-107731
Patent Document 2: JP-T No. 2007-526861

SUMMARY OF INVENTION

Technical Problem

Patent Document 1 describes a conveyance truck 1 that is capable of curving and is loaded with a large conveyance object W such as an automobile as shown in FIG. 2, FIG. 3, FIG. 8 and FIG. 9. Since four truck bodies (1A, 1B, 2A, and 2B) are connected with them being capable of curving so as to constitute one conveyance truck 1, as shown in FIG. 5 and FIG. 11, curvature angles between the truck bodies on a curved route C1 are comparatively small.

Therefore, as shown in FIG. 5 and FIG. 11, front and rear ends of the connecting truck bodies 2A and 2B inside the curved route C1 remain on a position that scarcely touch side linear portions of the adjacent front and rear truck bodies 1A and 1B, and do not interfere with the front and rear truck bodies 1A and 1B. For this reason, the conveyance truck 1 composed of the four truck bodies (1A, 1B, 2A, and 2B) can travel in a curved manner on the curved route C1 whose curvature radius is comparatively small.

In the conveyance device in Patent Document 1, when the conveyance truck 1 is composed of the four truck bodies (1A, 1B, 2A, and 2B), the curvature radii of the curved routes C1 and C2 can be comparatively small.

However, as shown in FIG. 2 and FIG. 8, since a width of the conveyance truck 1 is smaller than a width of the conveyance object W, a worker who is outside a widthwise direction of the conveyance object W cannot do a work with the worker standing on a working floor B formed on an upper surface of the truck, and thus the worker should do a work on the ground. For this reason, the worker needs to do a work while walking along travel of the truck 1 in order to do the work during continuous travel of the conveyance truck 1.

For this reason, it is preferable that the width of the truck 1 be increased to enable the worker to do a work on the truck 1 in the widthwise direction of the conveyance object W. However, when the width of the truck 1 is increased, radii of the front and rear arc-shaped protrusions of the truck bodies 1A and 1B become large, and thus a distance between horizontal rollers 5B and 5C as curved points becomes long so that the curvature angle between the truck bodies 1A and 1B becomes large. As a result, the adjacent front and rear truck bodies interfere with each other on the curved routes C1 and C2.

Further, since the four truck bodies (1A, 1B, 2A, and 2B) are connected so as to be capable of curving and compose the conveyance truck 1, the number of movable parts is large, its structure is complicated, and a size of the truck body 1A loaded with the conveyance object W is small. For this reason, the truck body 1A has no space where an elevating device, which is necessary when a height of the conveyance object W is changed between steps, is installed.

For this reason, it is preferable that the truck body 1A be enlarged in a front-rear direction and a widthwise direction so that the elevating device can be installed, and the conveyance truck 1 be composed of the two truck bodies (1A and 2A) in order to simplify the structure. However, when the truck body 1A is enlarged in the front-rear direction and the widthwise direction, similarly to a case where the width of the truck 1 is increased, the adjacent front and rear truck bodies (1A and 2A) interferes with each other on the curved routes (see an interference portion I in a schematic planar view of FIG. 20(a)).

In a case where the truck body 1A is enlarged in the horizontal direction and the widthwise direction and the conveyance truck 1 is composed of the two truck bodies (1A and 2A) described above, in order to avoid the interference between the adjacent front and rear truck bodies on the curved route, front and rear ends of the connecting truck body 2A inside the curved route should be removed. Such a form prevents the side surfaces of the two truck bodies (1A and 2A) composing the conveyance truck 1 from having a linear shape on a linear route as shown in a schematic plan view of FIG. 20(b). For this reason, when, for example, a floor whose height is the same as the upper surfaces of the truck bodies is formed with a slight gap being provided to outer side surfaces of the truck bodies, a comparatively large gap CL is generated between the side surface of the truck and the floor on the linear route. Therefore, an eaves-shaped cover CV that is fixed to the floor and protrudes above the gap CL should be provided to the linear route as shown in FIG. 20(b) so that a foot of the worker is not caught by the gap CL.

When such an eaves-shaped cover CV is provided, the worker might stumble over a step generated due to the cover CV, and a floor area on the truck upper surface on which the worker rides is decrease. For this reason, workability is deteriorated. Further, the manufacturing and construction of the cover CV increase manufacturing cost.

Furthermore, when a drive unit is a friction type drive unit having a friction roller, it is desirable that a surface to be driven that touches the friction roller be a side surface of the conveyance truck 1 and an installation position of the drive unit be not below the conveyance truck 1 but outside the side portion in order to lower the height of the conveyance truck 1. However, when the front and rear ends of the connecting truck body 2A inside the curved route are removed in order to avoid the interference, the step is formed on the surface to be driven that is touched by the friction roller FR on the linear route as shown in a schematic plan view of FIG. 20(c). For this reason, stable friction driving cannot be performed, and abrasion and breakage of the friction roller FR are caused.

Further, in a case where the truck body 1A is enlarged in the front-rear direction and the widthwise direction, the conveyance truck 1 is composed of the two truck bodies (1A and 2A) and the front and rear ends of the connecting truck body 2A inside the curved route are removed in order to avoid the interference, the large curvature angle between the front and rear truck bodies composing the conveyance truck 1 occasionally disables pushing of the truck due to the friction roller of the friction type drive unit provided to the curved route at a curvature point, namely, the stable friction driving cannot be performed. When the separated conveyance truck 1 is conveyed along the curved route C2 as shown in FIG. 1 of Patent Document 1, the friction roller of the friction type drive unit have to be disposed on the curved route C2 at an interval shorter than an entire length of the surface to be driven of the one conveyance truck 1. Further, also when the conveyance trucks 1 are conveyed out with the conveyance trucks 1 being connected with each other as shown in FIG. 1 of Patent Document 1 (the conveyance truck group A), the friction type drive unit is occasionally provided to the curved route C1.

Patent Document 2 describes the supporting element 2 that is formed larger by enlarging its profile with respect to positions of front, rear, right and left supporting rollers 13 so that a large conveyance object such as an automobile can be loaded as shown in FIG. 4 (see paragraph [0032]).

When the supporting element 2 whose both front and rear end surfaces in the conveyance direction are arc-shaped projections in plan view is formed large in the front-rear direction and the widthwise direction, a working space where a worker rides thereon and do a work can be secured, and a space where the elevating device (see Claim 14, and paragraphs [0025] and [0030]) is incorporated can be secured.

However, since large recess and projection are generated on inner and outer surfaces of the supporting elements 2 and the intermediate elements 8 in a radial direction on the curved route in FIG. 3, an eaves-shaped cover (see a coated portion 12 in FIG. 1) that largely protrudes from a ground side above the supporting elements 2 needs to be provide to the curved route in order to cover the recesses and projections so that a worker does not drop his/her foot.

When the eaves-shaped cover that largely projects is provided, a floor area of the upper surface of the truck on which the worker rides is reduced, and thus the workability is deteriorated. Further, manufacturing and construction of the cover increase the manufacturing cost.

Furthermore, since the recesses and projections are generated on inner and outer surfaces of the supporting elements 2 and the intermediate elements 8 in the curvature radial direction with respect to the curved route, the side surface of the truck cannot be the surface to be driven to be touched by the friction roller on the curved route in FIG. 3. Therefore, the friction type drive unit having the friction roller to touch the side surface of the truck cannot be provided to the curved route.

Therefore, in view of the above situation, a solution to the present invention is to provide a conveyance device that can convey a conveyance truck using a friction type drive unit. The conveyance truck is composed of two truck bodies that can be loaded with a large conveyance object such as an automobile and have a space where an elevating device can be installed, and on which a worker rides and does a work in a widthwise direction of the conveyance object. The friction type drive unit is disposed on a linear route or a curved route because as an eaves-shaped cover for covering gaps, recesses and projections does not have to be provided to the linear route and the curved route or a size of the eaves-shaped cover can be minimum, a decrease in the floor area of the upper surface of the truck on which the worker rides becomes minimum. As a result, workability can be improved and manufacturing cost can be reduced.

Solution to Problem

In order to solve the above problem, the present invention provides a conveyance device for conveying a non-self-propelled conveyance truck loaded with a conveyance object along a conveyance route including a curved route and enabling a floor continuous with the conveyance truck to be formed on an entire or a part of the conveyance route. The conveyance device includes a guide rail that guides the conveyance truck along the conveyance route and is constructed along the conveyance route, a friction type drive unit that has a friction roller to touch a surface to be driven of the conveyance truck, and a connecting device for connecting the conveyance trucks on front and rear positions. The conveyance truck is configured so that a first truck body whose both front and rear end surfaces are arc-shaped projections in plan view is connected to a second truck body whose both front and rear end surfaces are arc-shaped recesses in plan view to be capable of curving at arc centers of one of the arc-shaped projections of the first truck body and one of arc-shaped recesses of the second truck body in a horizontal direction with that one of the arc-shaped projections of the first truck body being opposed to that one of the arc-shaped recesses of the second truck body, upper surfaces of the first truck body and the second truck body are approximately horizontal surfaces, and the first truck body supports the conveyance object, or the first truck body one of whose front and rear end surfaces is an arc-shaped projection in plan view and other one of whose front and rear end surfaces is an arc-shaped recess in plan view is connected to the second truck body one of whose front and rear end surfaces is an arc-shaped projection in plan view and other one of whose front and rear end surfaces is an arc-shaped recess in plan view to be capable of curving at arc centers of the arc-shaped recess of the first truck body and the arc-shaped projection of the second truck body in the horizontal direction with the arc-shaped recess of the first truck body being opposed to the arc-shaped projection of the second truck body, the upper surfaces of the first truck body and the second truck body are approximately horizontal surfaces, and the conveyance object is supported by the first truck body or the second truck body, or the first truck body and the second truck body. Portions of the second truck body or portions of the first truck body and the second truck body radially inside the curved route forming the arc-shaped recesses are composed of mobile bodies that make side surfaces of the first truck body and the second truck body approximately linear on a linear route and touch the side surface of the adjacent truck body to move on the curved route.

In such a constitution, since the conveyance truck is composed of the two truck bodies (the first truck body and the second truck body) connected so as to be capable of curving in the horizontal direction, the conveyance truck can be formed largely in the front-rear direction and the widthwise direction. For this reason, even when the truck is loaded with a large conveyance object such as an automobile, a work space where a worker rides and does works can be secured on the truck in a lengthwise direction and the widthwise direction of the conveyance object, and a space where an elevating device is incorporated can be secured.

Further, since a plurality of conveyance trucks whose upper surfaces are approximately horizontal surfaces is connected by a connecting device so as to be capable of forming a conveyance truck group, the upper surfaces of the conveyance truck group can be a continuous working floor where the worker rides and does the installation works, and the conveyance truck group can be disposed on the conveyance route including the curved route. For this reason, working efficiency and space efficiency can be improved.

Further, since the portions that form the arc-shaped recesses of the truck bodies and are radially inside the curved route are the mobile bodies, the side surfaces of the first truck body and the second truck body including the side surfaces of the mobile bodies form the approximately linear shape on the linear route, and the movable portion touches the side surface of the adjacent truck body to operate on the curved route. As a result, the front and rear ends on the inner side do not have to be removed in order to avoid the interference on the curved route (cut-away portions do not have to be provided), and thus eaves-shaped covers for covering the gaps, the recesses and projections do not have to be provided to the linear route or the curved route, or a size of the eaves-shaped covers can be minimized. Therefore, since a decrease in the floor area of the upper surface of the truck where the worker rides is minimum, the workability can be improved and the manufacturing cost can be reduced.

It is preferable that the side surfaces of the first truck body and the second truck body including the side surfaces of the mobile bodies be the surfaces to be driven to be touched by the friction roller, and angles between the side surfaces of the mobile bodies and the side surface of the adjacent truck body on the curved route be larger than the angle between the first truck body and the second truck body.

In such a constitution, since the side surfaces of the first truck body and the second truck body including the side surfaces of the mobile bodies form the approximately linear shape on the linear route and the mobile bodies touch the side surface of the adjacent truck body to operate on the curved route. For this reason, the front and rear ends on the inner side do not have to be removed in order to avoid the interference on the curved route (the cut-away portions do not have to be provided), and thus a large gap is not generated on the side surfaces of the first truck body and the second truck body on the linear route.

Therefore, since a step is not formed on the side surfaces of the first truck body and the second truck body including the side surfaces of the mobile bodies on the linear route, the friction type drive unit can be provided to the linear route, and even when the friction roller of the friction type drive unit is allowed to touch the side surface as the surface to be driven, stable friction driving can be performed. As a result, the abrasion and breakage of the friction roller is not caused.

Further, the mobile bodies touch the side surface of the adjacent truck body so as to operate on the curved route, and the recesses and projections are not generated on the inner surface of the conveyance truck in a curvature radius direction on the curved route. For this reason, the friction type drive unit can be provided to the curved route, and even when the friction roller of the friction type drive unit is allowed to touch the side surface as the surface to be driven, stable friction driving can be performed, and the abrasion and breakage of the friction roller are not caused.

Further, even when the curvature radius of the curved route is decreased and the curvature angle of the first truck body and the second truck body is increased, the angles between the side surfaces of the mobile bodies and the side surface of the adjacent truck body on the curved route is larger than the angle between the first truck body and the second truck body. For this reason, since an angle change of the surface to be driven to be touched by the friction roller is comparatively smooth, a phenomenon that the pushing-out of the truck by the friction roller is disabled at the curvature point is not caused, and thus the driving by means of the friction type drive unit provided to the curved route becomes more stable and secure.

Further, since the surface to be driven to be touched by the friction roller as the side surface of the conveyance truck can be driven by the friction type drive unit on the linear route and the curved route, the height of the conveyance truck can be further lowered, and the drive unit can be shared and the truck structure can be simplified.

Further, it is preferable that the mobile bodies be oscillation pieces that can oscillate about vertical shafts, respectively, and energizing units for energizing the oscillation pieces to a direction approaching the side surface of the truck body when the oscillation pieces touch the side surface of the adjacent truck body so as to oscillate on the curved route be provided.

In such a constitution, since the mobile bodies are formed by the oscillation pieces that can oscillate about the vertical shafts, respectively, the constitution of the mobile bodies becomes simple and thus the manufacturing cost can be reduced. At the same time, since the energizing units for energizing the mobile bodies having such a simple mechanism to a predetermined direction are provided, the mobile bodies do not open sideways due to impact and oscillation at a time of the conveyance of the truck, and thus the motion of the mobile bodies becomes stable and secure.

Further, the connecting device connects and disconnects the conveyance trucks on the front and rear positions through oscillation of oscillation arms that are provided to the conveyance truck and oscillate about horizontal support shafts, respectively, in a horizontal direction. In a state that the connecting device connects the conveyance trucks, the horizontal rollers touch front and rear surfaces of an arc-shaped plate member in plan view whose arc center is identical to arc centers of the arc-shaped projection and the arc-shaped recess, respectively, at the connecting portion of the conveyance trucks so that the conveyance trucks are prevented from being separated. It is preferable that horizontal guide rollers to be guided by the guide rail from outer right and left sides be provided to the arc centers of the two arc-shaped projections in the conveyance truck, respectively, and that right and left horizontal guide rollers to be guided by the guide rail from inner right and left sides be mounted to either side of the horizontal guide roller, that is connected to another conveyance truck by the connecting device, on the side of the connecting portion of the another conveyance truck at a front end of a guide rod extended toward the another conveyance truck connected from the second truck body.

In such a constitution, since the connecting device connects and disconnects the conveyance trucks on the front and rear positions through the oscillation of the oscillation arms that are provided to the conveyance truck and oscillate about the horizontal support shafts in the horizontal direction, the constitution is simple. For this reason, the manufacturing cost can be reduced, the operation reliability is high, and the connecting and the disconnecting operations become easy.

Further, in the state that the conveyance trucks on the front and rear positions are connected by the connecting device, since the horizontal rollers touch a front surface and a rear surface of the arc-shaped plate member and the front and rear conveyance trucks are prevented from being separated, the curvature of the front and rear conveyance trucks connected by the connecting device on the curved route becomes smooth.

Further, since the horizontal guide rollers provided to the arc centers of the two arc-shaped projections in the conveyance truck are guided by the guide rail from outer right and left sides and the horizontal guide rollers provided to the front end of the guide rod is guided by the guide rail from inner right and left sides, the first truck body and the second truck body can be guided by the same guide rail.

Further, since the horizontal guide rollers provided to the front end of the guide rod extended from the second truck body are guided by the guide rail, even when the single conveyance truck is conveyed, the second truck body can be securely guided, and in the state that the front and rear conveyance trucks are connected by the connecting device, the horizontal guide rollers provided to the front end of the guide rod are positioned on either side of the horizontal guide rollers to be guided by the guide rail from the outer right and left sides and are guided by the guide rail from the inner right and left sides. For this reason, loci are the same as each other in the case where the front and rear conveyance trucks are connected to be conveyed and the case where the single conveyance truck is conveyed, and thus the gap between the conveyance truck and a facility on the ground can be minimized.

Advantageous Effects of Invention

The conveyance device of the present invention produces the following remarkable effects.
(1) Since the conveyance truck is composed of the two truck bodies connected so as to be capable of curving in the horizontal direction, the conveyance truck can be formed largely in the front-rear direction and the widthwise direction, so that even when the conveyance truck is loaded with a large conveyance object, the work space where the worker rides and does works can be secured on the truck in a lengthwise direction and the widthwise direction of the conveyance object, and the space where the elevating device is installed can be secured.
(2) Since the portions that form the arc-shaped recesses of the truck bodies and are radially inside the curved route are the mobile bodies, the eaves-shaped covers for covering the gaps, recesses and projections do not have to be provided to the linear route and the curved route, or the sizes of the eaves-shaped covers can be minimized, so that the workability can be improved and the manufacturing cost can be reduced because the reduction in the floor area of the upper surface of the truck on which the worker rides is minimum.

BRIEF DESCRIPTION OF THE DRAWINGS

FIG. 17(a) illustrates a state that the following truck approaches the preceding truck, FIG. 17(b) illustrates a state that the following truck further approaches the preceding truck, and pieces to be operated are operated by an operating unit so as to oscillate down, and FIG. 17(c) illustrates a state that the following truck further approaches the preceding truck so that the connection is completed by the connecting device;

FIG. 19(a) illustrates a case where the first truck body and the second truck body have the same size, and FIG. 19(b) illustrates a case where the first truck body is larger than the second truck body; FIG. 20(a) illustrates an example where the conveyance truck 1 travels on a curved route, FIG. 20(b) illustrates an example of an eaves-shaped cover CV for covering a gap CL provided to a linear route, and FIG. 20(c) illustrates an example of a step to be formed on a surface to be driven on the conveyance truck 1 to be touched by a friction roller FR on a linear route.

DESCRIPTION OF EMBODIMENTS

An embodiment of the present invention is described in detail below with reference to the accompanying drawings, but the present invention is not limited to the embodiment illustrated in the accompanying drawings and includes all embodiments that fulfill requirements described in Claims.

In this specification, a conveyance direction of a conveyance object is a front and its opposite direction is a rear, right and left are viewed from the front, and plan views are viewed from the left.

Figure 1:
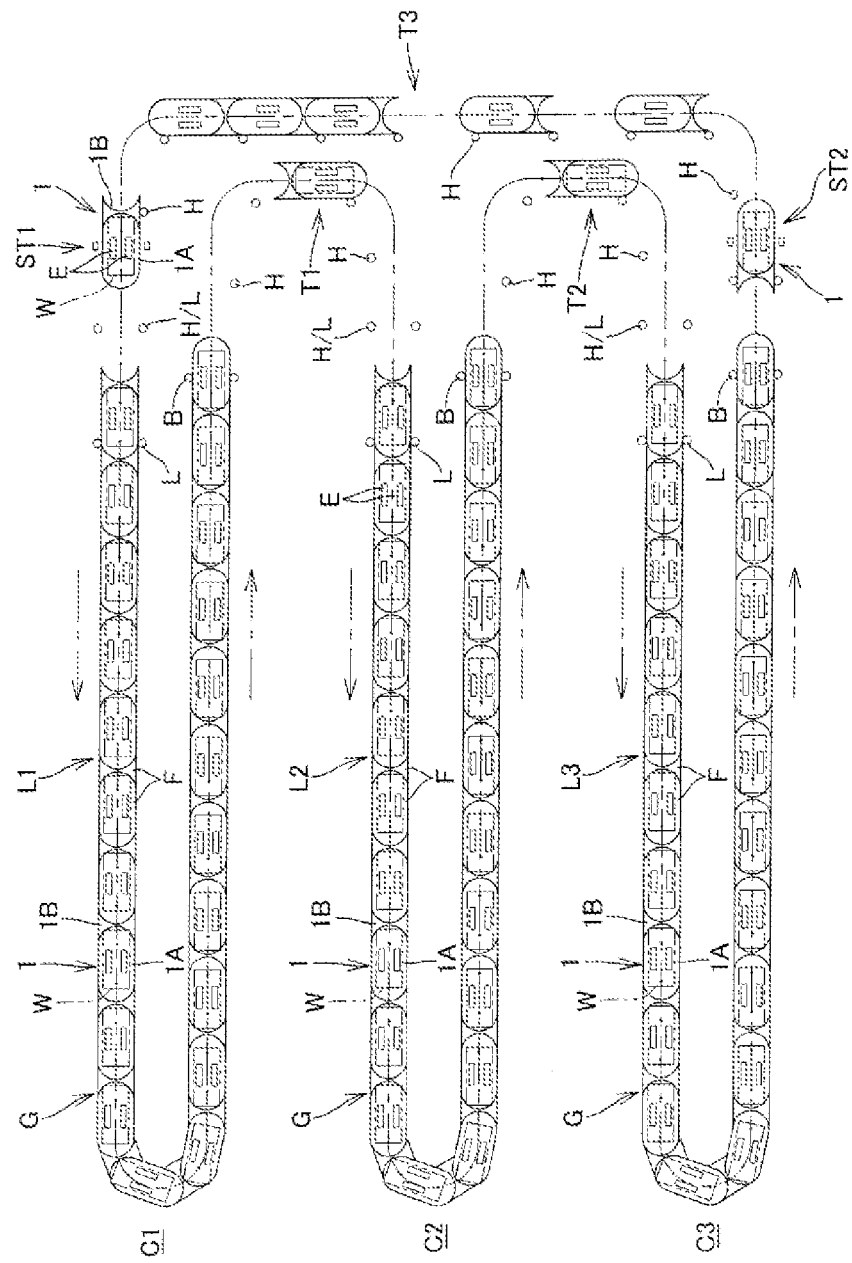
FIG. 1 is a schematic layout diagram illustrating a conveyance device according to an embodiment of the present invention.

A schematic layout diagram of FIG. 1 illustrates one example of a layout using a conveyance device according to an embodiment of the present invention in an assembly line in an automobile factory. A non-self-propelled conveyance truck 1 is driven by using a low-speed driving unit L, a braking unit B, a high-speed driving unit H and high-speed/low-speed driving units H/L that are the friction type drive unit and they performs required conveyance.

In FIG. 1, a trim line L1 as a first work line is a work line in which a work for installing interior trims is performed with an elevating device E descending and a height of a conveyance object W as a vehicle body being low. A chassis line L2 as a second work line is a work line in which a suspension, an engine and the like are installed with the height of the conveyance object W being raised by the elevating device E. A final line L3 as a third work line is a work line in which exterior trims are installed and cooling water is injected with the elevating device E descending and the height of the conveyance object W being low.

In these work lines L1, L2, and L3, conveyance trucks 1 are connected by a connecting device C, described later, so as to form a conveyance truck group G, and a worker rides on a working floor F as a continuous floor and does the works.

Further, the conveyance object W as the vehicle body is loaded into the single conveyance truck 1 at a loading station ST1 on an upper-stream side of the trim line L1, and the conveyance object W is unloaded from the single conveyance truck 1 at an unloading station ST2 on a lower-stream side of the final line L3.

Further, the single conveyance truck 1 separated from a conveyance truck group G is conveyed from the trim line L1 to the chassis line L2 by a conveyance line T1 between the work lines, and the single conveyance truck 1 separated from a conveyance truck group G is conveyed from the chassis line L2 to the final line L3 by a conveyance line T2 between the work lines.

Further, the empty conveyance truck 1 from which the conveyance object W is unloaded at the unloading station ST2 is conveyed to the loading station ST1 by an empty truck return line T3.

The conveyance device according to the embodiment of the present invention conveys the non-self-propelled conveyance trucks 1 loaded with the conveyance objects W along a conveyance route including curved routes C1, C2, and C3, and the working floor F that is a floor continuous with the conveyance trucks 1 can be formed on a part of the conveyance route.

When the conveyance route is a closed route, the working floor F may be formed on the conveyance trucks 1 along an entire region of the conveyance route. Such a case has an advantage such that the worker can do the works on the entire region (the entire length) of the conveyance route. In this case, however, since the individual conveyance trucks 1 cannot be stopped to be loaded or unloaded with the conveyance objects W, the conveyance objects W are loaded or unloaded in synchronization with the conveyance trucks 1 that are moving at a constant speed, or all the conveyance trucks 1 are stopped at once to be loaded or unloaded with the conveyance objects W.

Figure 2:
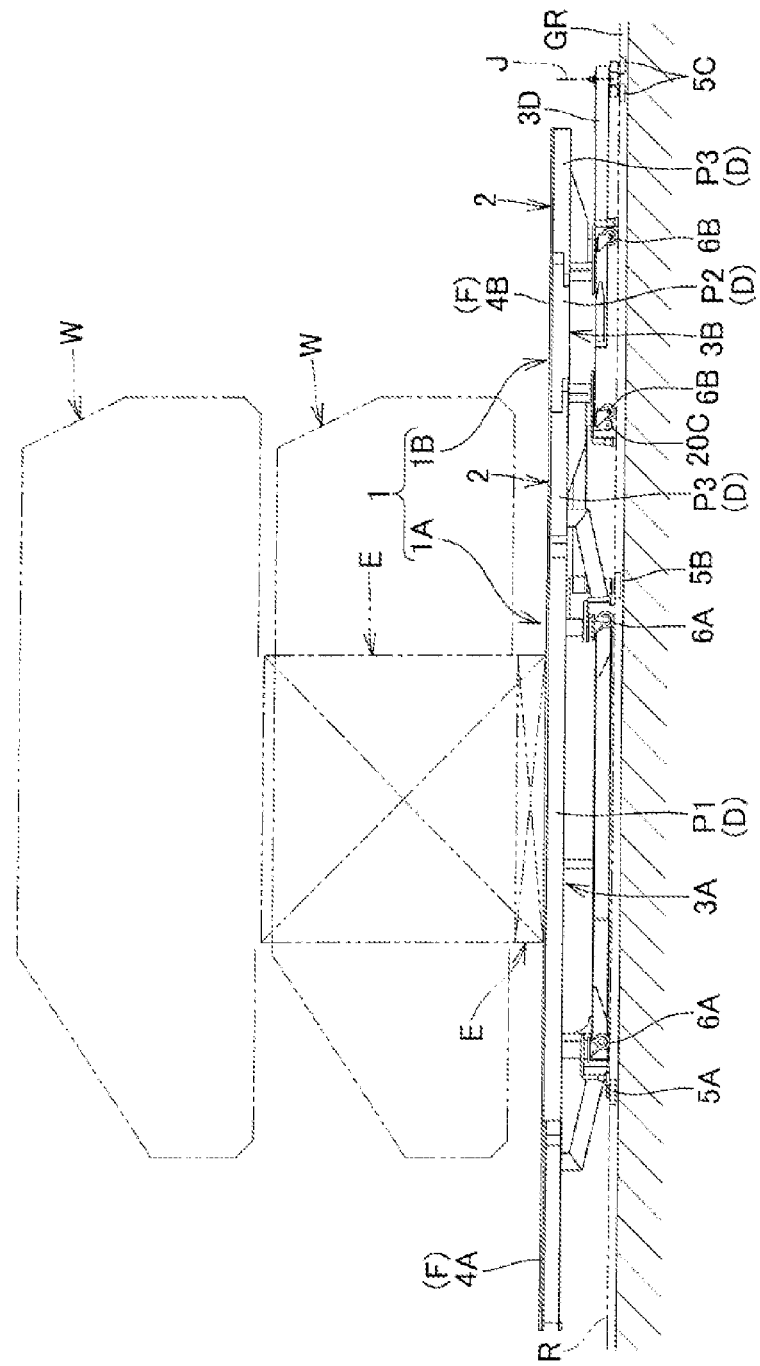
FIG. 2 is a front view of a conveyance truck.
Figure 3:
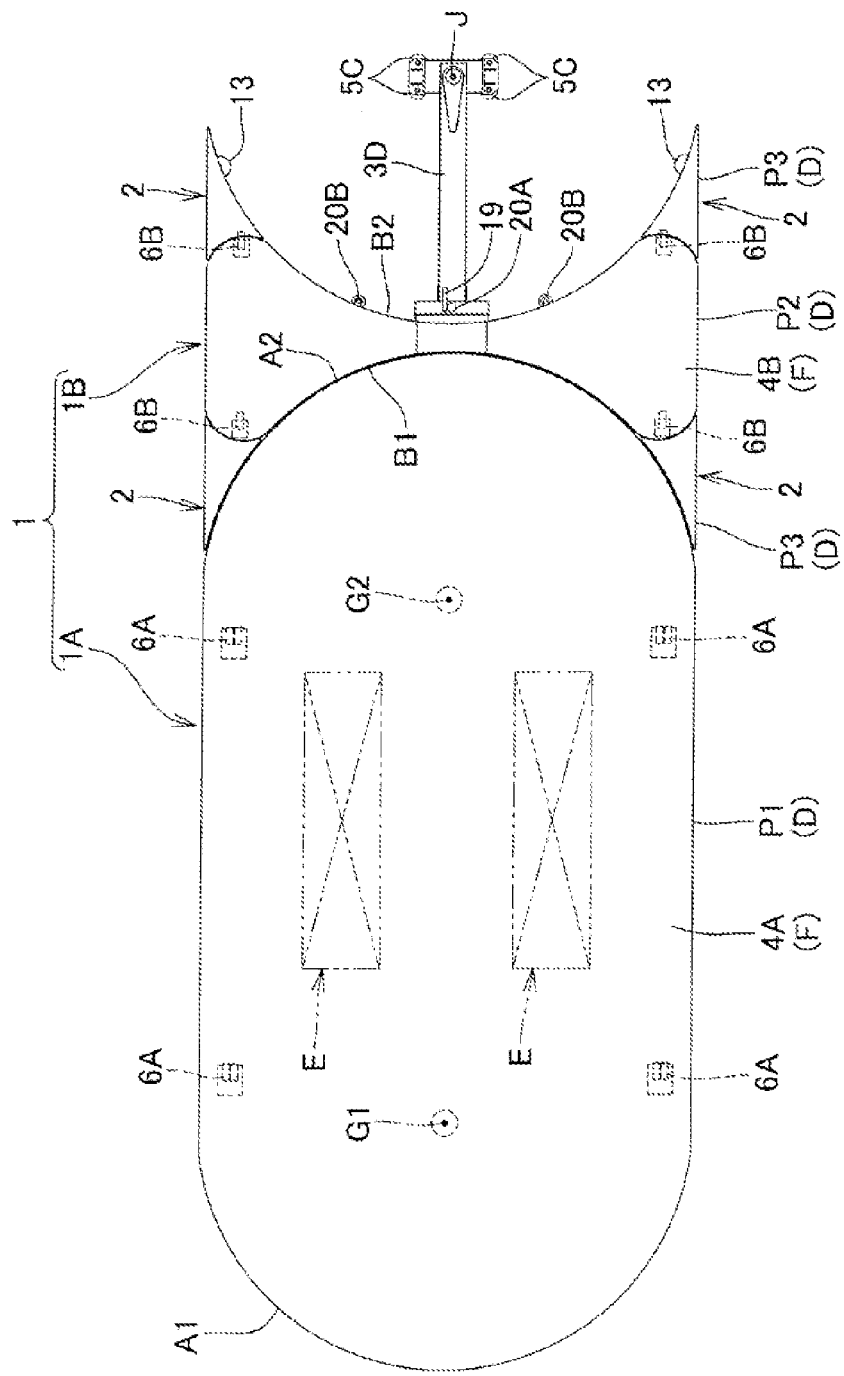
FIG. 3 is a plan view of the conveyance truck.
Figure 4:
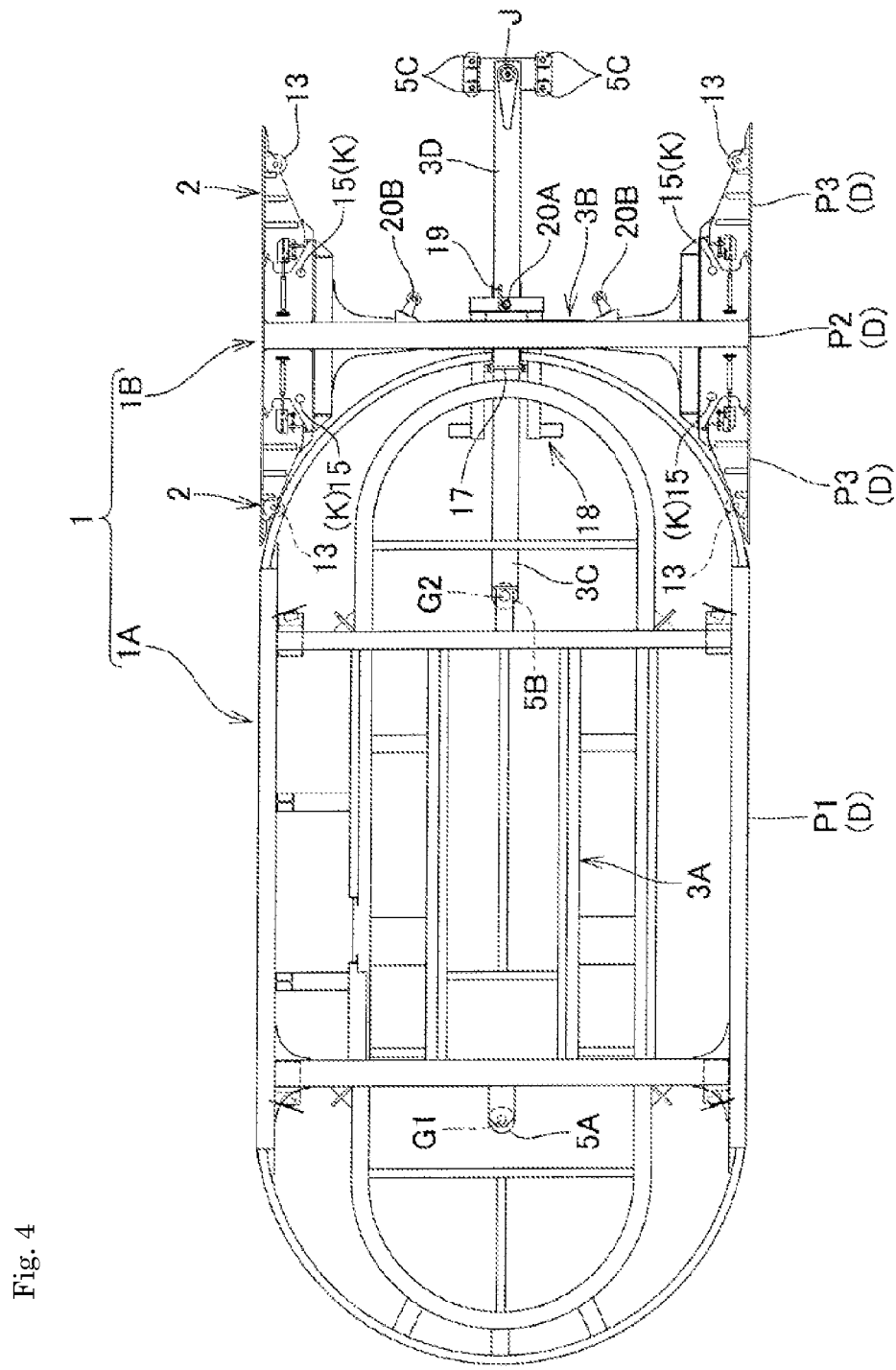
FIG. 4 is a plan view illustrating a state that an upper surface plate is removed from the conveyance truck.
Figure 5:
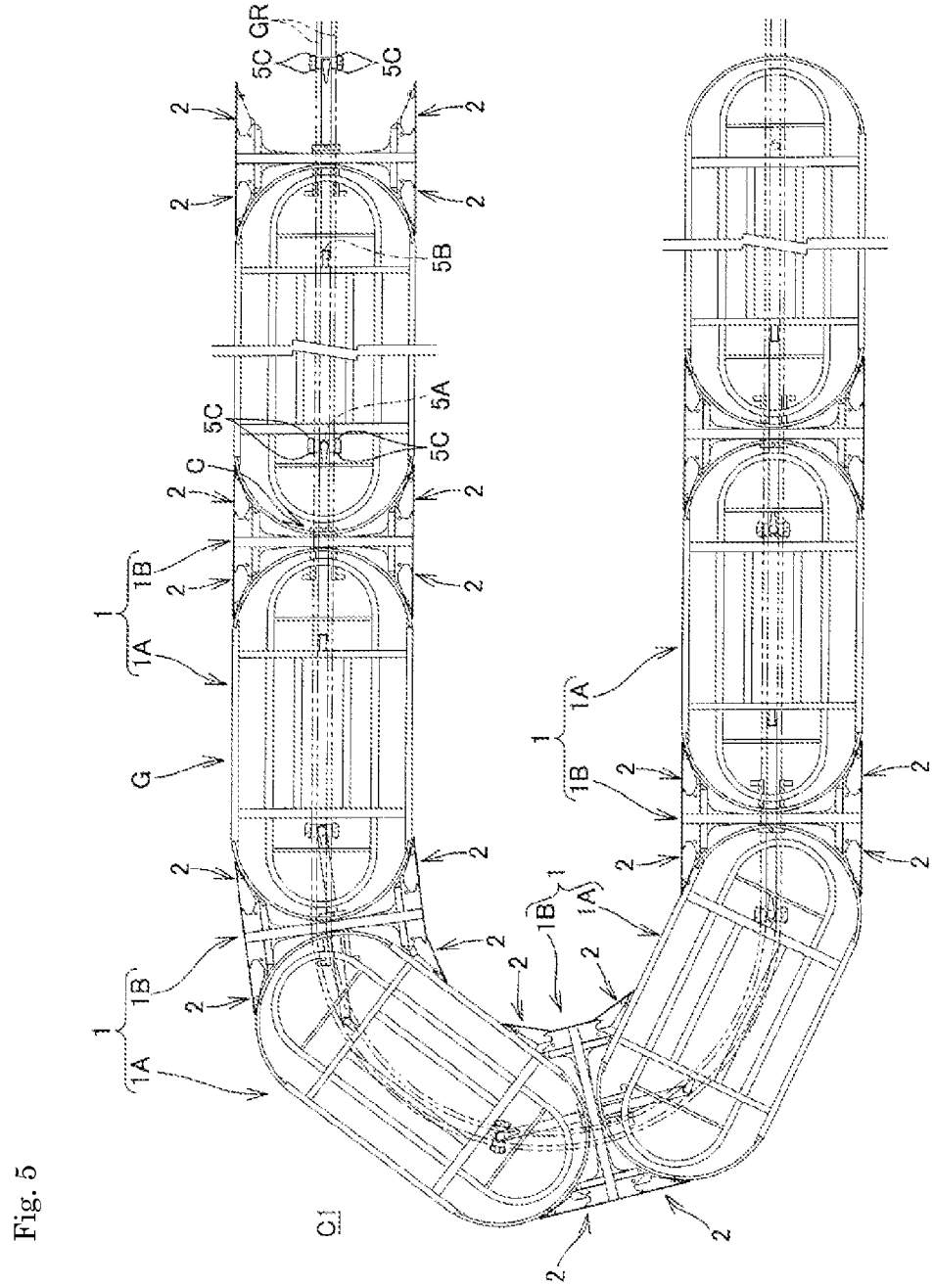
FIG. 5 is a schematic plan view of a conveyance truck group illustrating a state that the upper surface plate is removed.

As shown in the front view of FIG. 2, the plan views of FIG. 3 and FIG. 4, and the schematic plan views of FIG. 5 illustrating the conveyance truck group, the conveyance truck 1 according to the embodiment of the present invention is composed of a first truck body 1A and a second truck body 1B, an upper surface of the conveyance truck 1 is a schematically horizontal surface (see upper surface plates 4A and 4B in FIG. 2 and FIG. 3), the first truck body 1A supports the conveyance object W, and the first truck body 1A has the elevating device E (see FIG. 2) that ascends and descends the conveyance object W.

Further, as shown in FIG. 3, the first truck body 1A has an oval shape in which its front and rear end surfaces of the first truck body 1A are arc-shaped projections A1 and A2 in plan view, and a second truck body 1B has a hourglass shape in which its front and rear end surfaces are arc-shaped recesses B1 and B2 in planar view.

Portions radially inside the curved route that form the arc-shaped recesses B1 and B2 of the second truck body 1B are, as shown in FIG. 5, are composed of oscillation pieces 2 as mobile bodies. The oscillation pieces 2 make side surfaces of the first truck body 1A and the second truck body 1B approximately linear on a linear route and touch the side surface of the first truck body 1A on the curved route.

Figure 6:
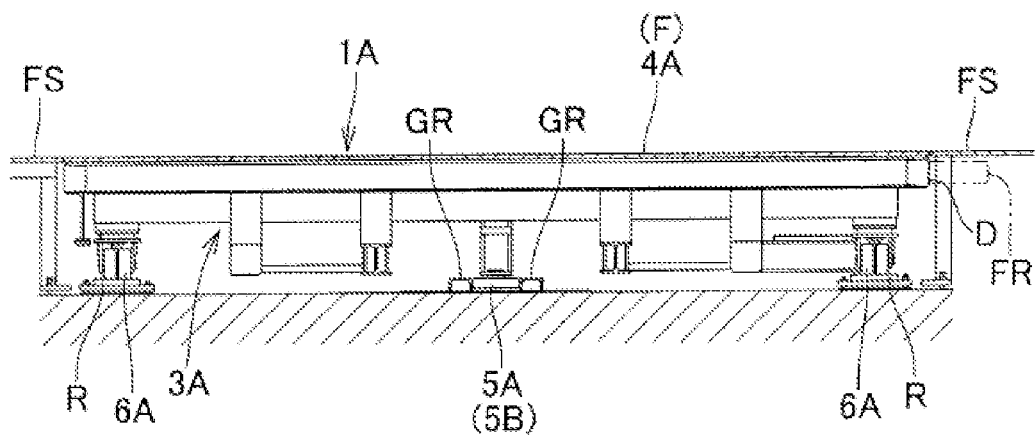
FIG. 6 is a vertical sectional view illustrating a state where a horizontal roller of a first truck body is guided by a guide rail viewed from a rear side.

Further, as shown in the front view of FIG. 2, the plan view of FIG. 3, and the vertical sectional view viewed from a rear side in FIG. 6, traveling wheels 6A are mounted to front, rear, right and left sides of a frame body 3A of the first truck body 1A, and traveling wheels 6B are mounted to front, rear, right and left sides of a frame body 3B of the second truck body 1B. The traveling wheels 6A and 6B roll to move on right and left traveling rails R constructed along the conveyance route.

As shown in FIG. 4, a front end of a connecting rod 3C extending forward from the frame body 3B of the second truck body 1B (to a side of the first truck body 1A) is connected to the frame body 3A of the first truck body 1A at an arc center G2 of the arc-shaped projection A2 and the arc-shaped recess B1 as shown in FIG. 3 so as to be turnable about a vertical shaft. For this reason, as shown in FIG. 3, the first truck body 1A and the second truck body 1B are connected to each other so as to be capable of curving about the arc center G2 in the horizontal direction with the arc-shaped projection A2 of the first truck body 1A being opposed to the arc-shaped recess B1 of the second truck body 1B.

Figure 7:
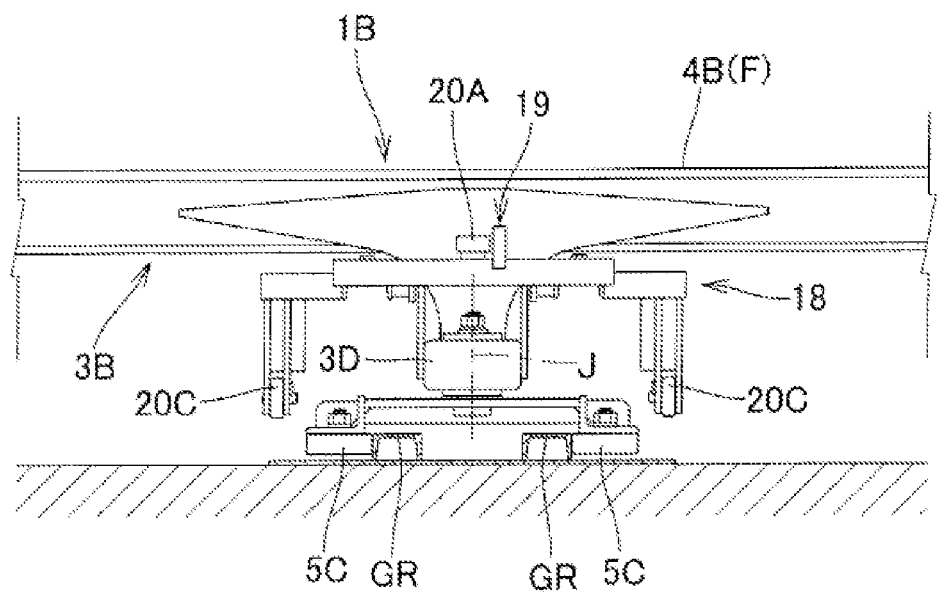
FIG. 7 is a vertical sectional view illustrating a state that the horizontal roller at a front end of a connecting rod extended to a rear direction from a second truck body is guided by the guide rail that is viewed from a rear side.

Further, as shown in the plan views of FIG. 4 and FIG. 5, and the vertical sectional views viewed from a rear side in FIG. 6 and FIG. 7, horizontal guide rollers 5A and 5B to be guided by a guide rail GR constructed along the conveyance route from outer right and left are provided to arc centers G1 and G2 of the two arc-shaped projections A1 and A2 in the conveyance truck 1, respectively.

Further, as shown in the plan views of FIG. 3 to FIG. 5, and the vertical sectional views viewed from the rear side in FIG. 6 and FIG. 7, horizontal guide rollers 5C are mounted to right and left sides of members being capable of oscillating about a vertical shaft J at a front end of a guide rod 3D extending backward from the frame body 3B of the second truck body 1B (to a side of another conveyance truck 1 to be connected). The horizontal guide rollers 5C are guided from inner right and left by the guide rail GR.

Therefore, the horizontal guide rollers 5A and 5B provided to the arc centers G1 and G2 of the two arc-shaped projections A1 and A2 in the conveyance truck 1, respectively, are guided from outer right and left by the guide rail GR, and the horizontal guide rollers 5C provided to the front end of the guide rod 3D are guided from inner right and left by the guide rail GR. For this reason, the first truck body 1A and the second truck body 1B can be guided by the one guide rail GR.

Since a position of the vertical shaft J at the front end of the guide rod 3D is coaxial with the horizontal guide roller 5A of another conveyance truck 1 in a state that the conveyance truck 1 is connected to the another conveyance truck 1 by the connecting device C, the horizontal guide rollers 5C are positioned on right and left sides of the horizontal guide roller 5A, as shown in FIG. 5.

Therefore, since the horizontal guide rollers 5C provided to the front end of the guide rod 3D extended from the second truck body 1B are guided by the guide rail GR, even when the single conveyance truck 1 is conveyed, the second truck body 1B can be securely guided.

Further, the horizontal guide rollers 5C provided to the front end of the guide rod 3D are positioned on the right and left sides of the horizontal guide roller 5A to be guided from outer right and left by the guide rail GR with the front and rear conveyance trucks 1 being connected by the connecting device C, and are guided from inner right and left by the guide rail GR. For this reason, since loci are the same as each other in the case where the front and rear conveyance trucks 1 are connected to be conveyed and in the case where the single conveyance truck 1 is conveyed, a gap between the conveyance truck 1 and a facility on the ground can be minimum.

As shown in FIG. 6, floors FS whose heights are the same as a height of the working floor F are disposed on the ground on either side of the conveyance trucks 1 (the conveyance truck group G) so as to be separated in a horizontal direction from the traveling locus of the conveyance trucks 1.

Figure 8:
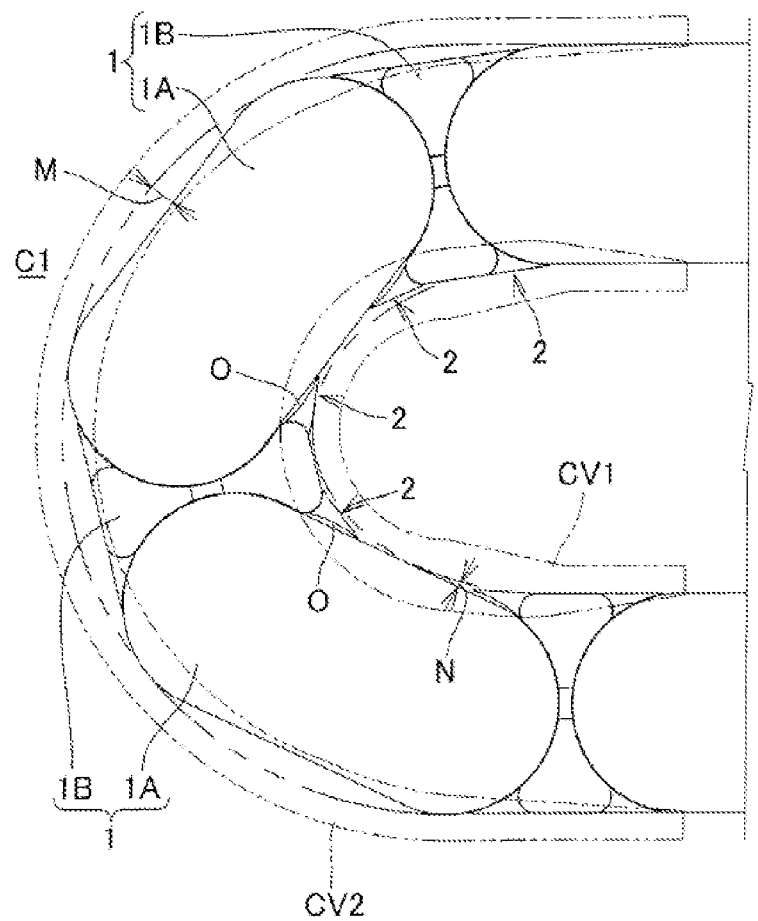
FIG. 8 is a schematic plan view illustrating an eaves-shaped cover provided to a curved route.
Figure 9:
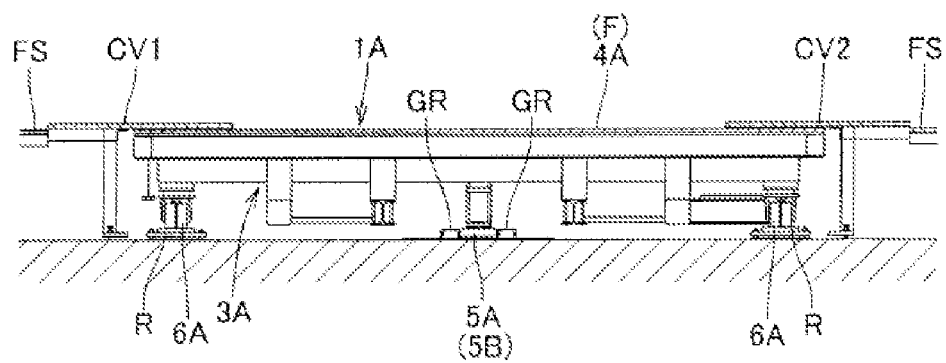
FIG. 9 is vertical sectional view illustrating the cover viewed from the rear side.

Further, as shown in the schematic plan view of FIG. 8 and the vertical sectional view of FIG. 9, a gap M of a radially outer direction and a gap N of a radially inner direction that are larger than the gap on the linear route are generated between the conveyance trucks 1 (the conveyance truck group G) on the curved route and the floors FS on the ground, and a gap O is generated on inner sides of the mobile bodies 2 in the horizontal direction according to motions of the mobile bodies 2 on the curved route.

Therefore, eaves-shaped covers CV1 and CV2 that extends from the floors FS above the trucks 1 to cover the gaps M, N, and O are provided to the curved route.

A constitutional example of the oscillation pieces 2 as the mobile bodies is described below.

Figure 10:
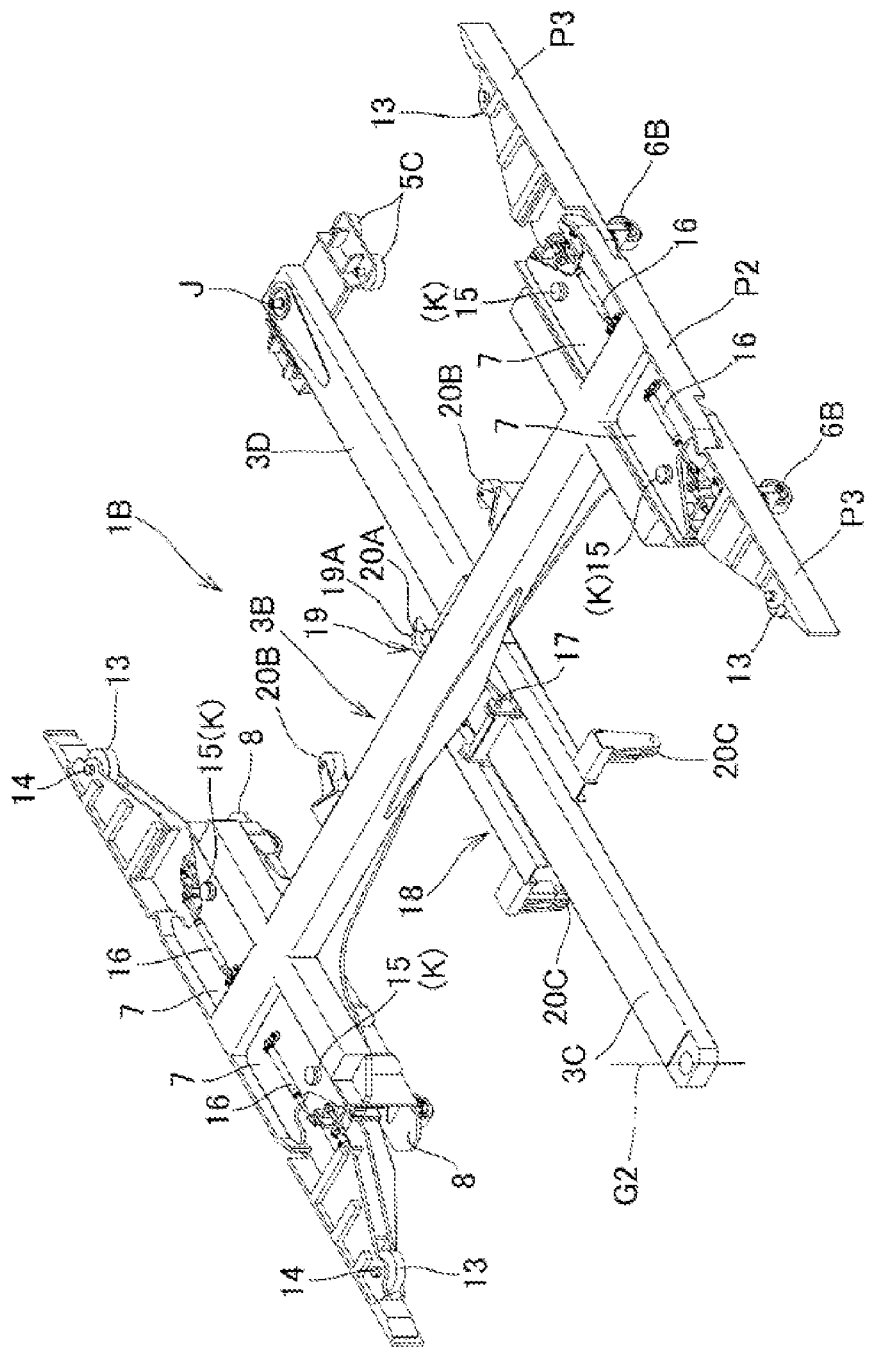
FIG. 10 is a perspective view of the second truck body from which the upper surface plate is removed.
Figure 11:
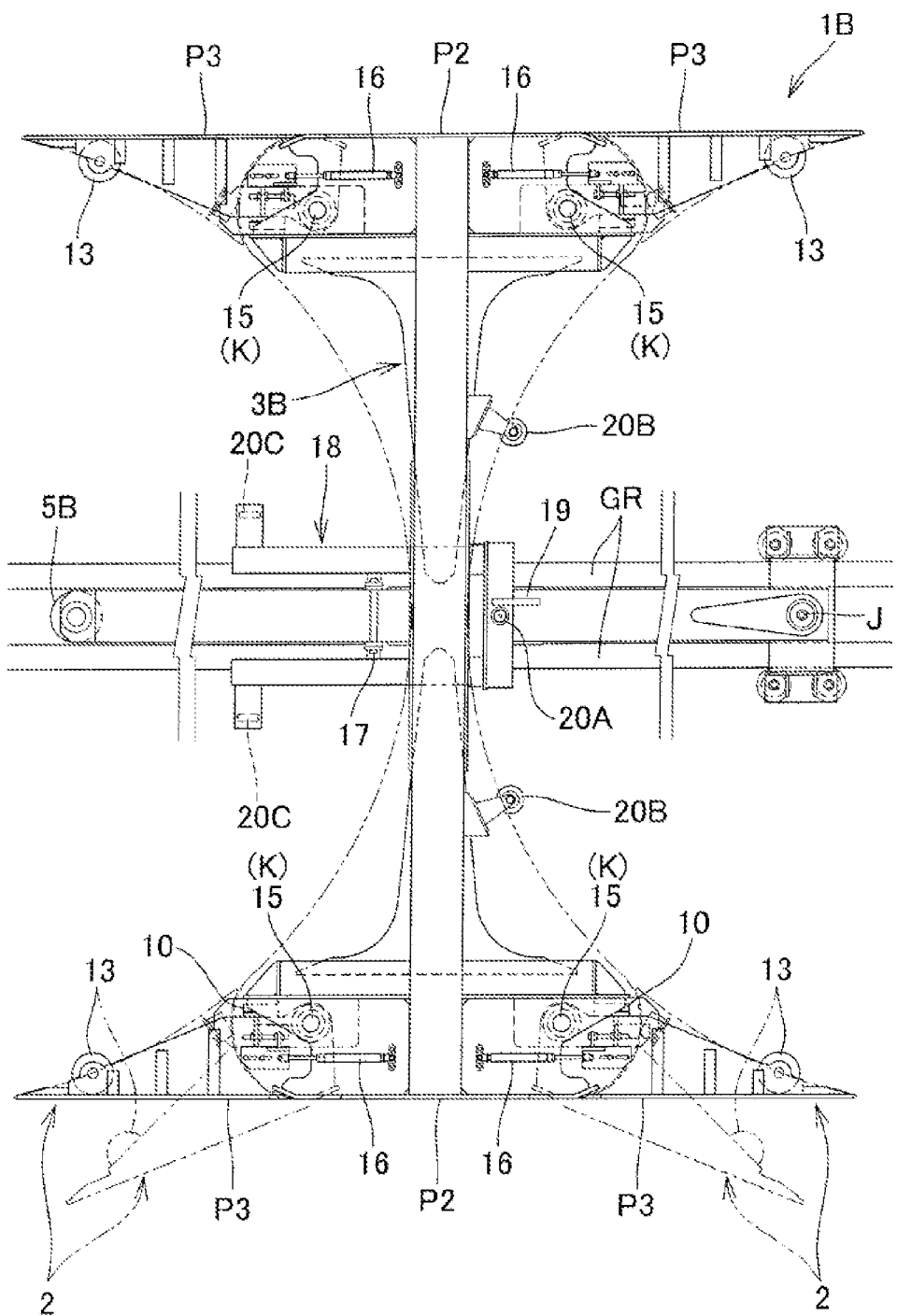
FIG. 11 is a plan view of the second truck body in the same state.
Figure 12:
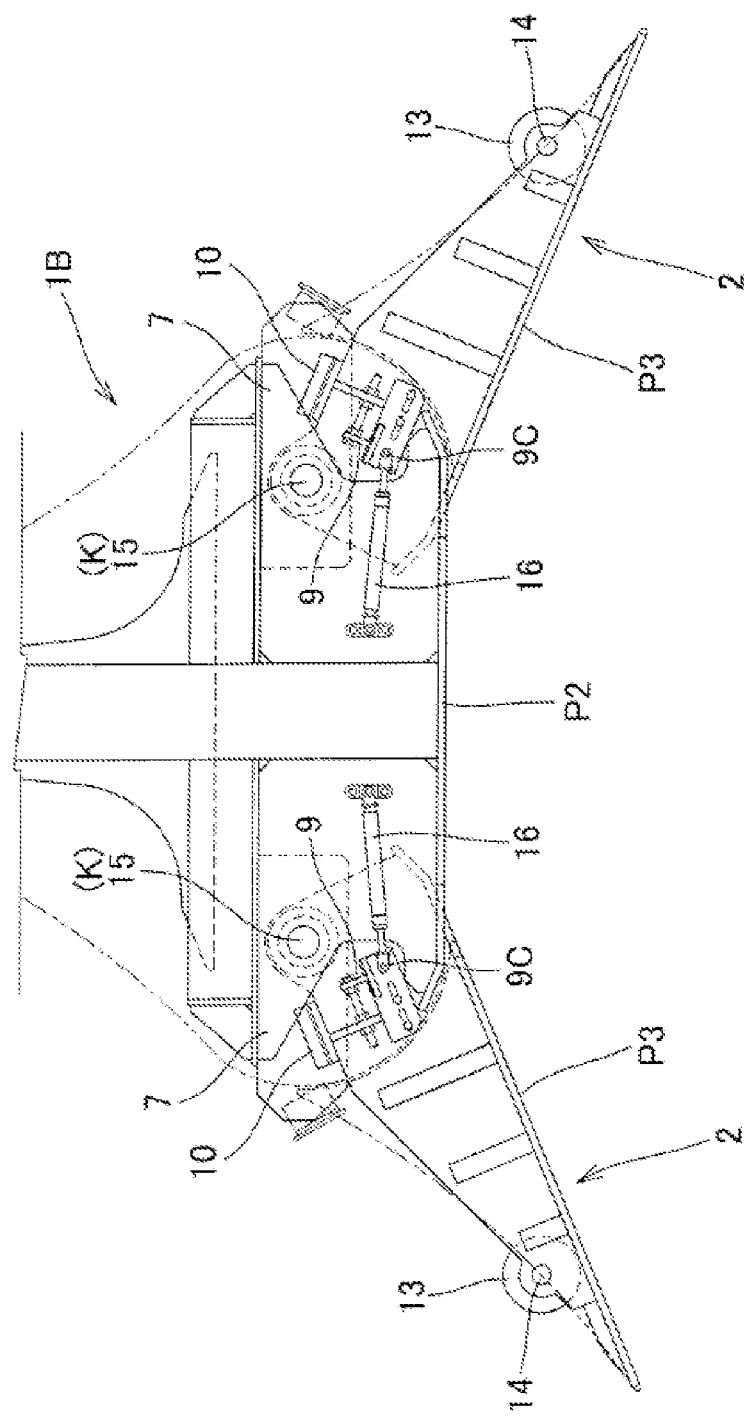
FIG. 12 is an enlarged plan view illustrating a main section of the second truck body.
Figure 13:
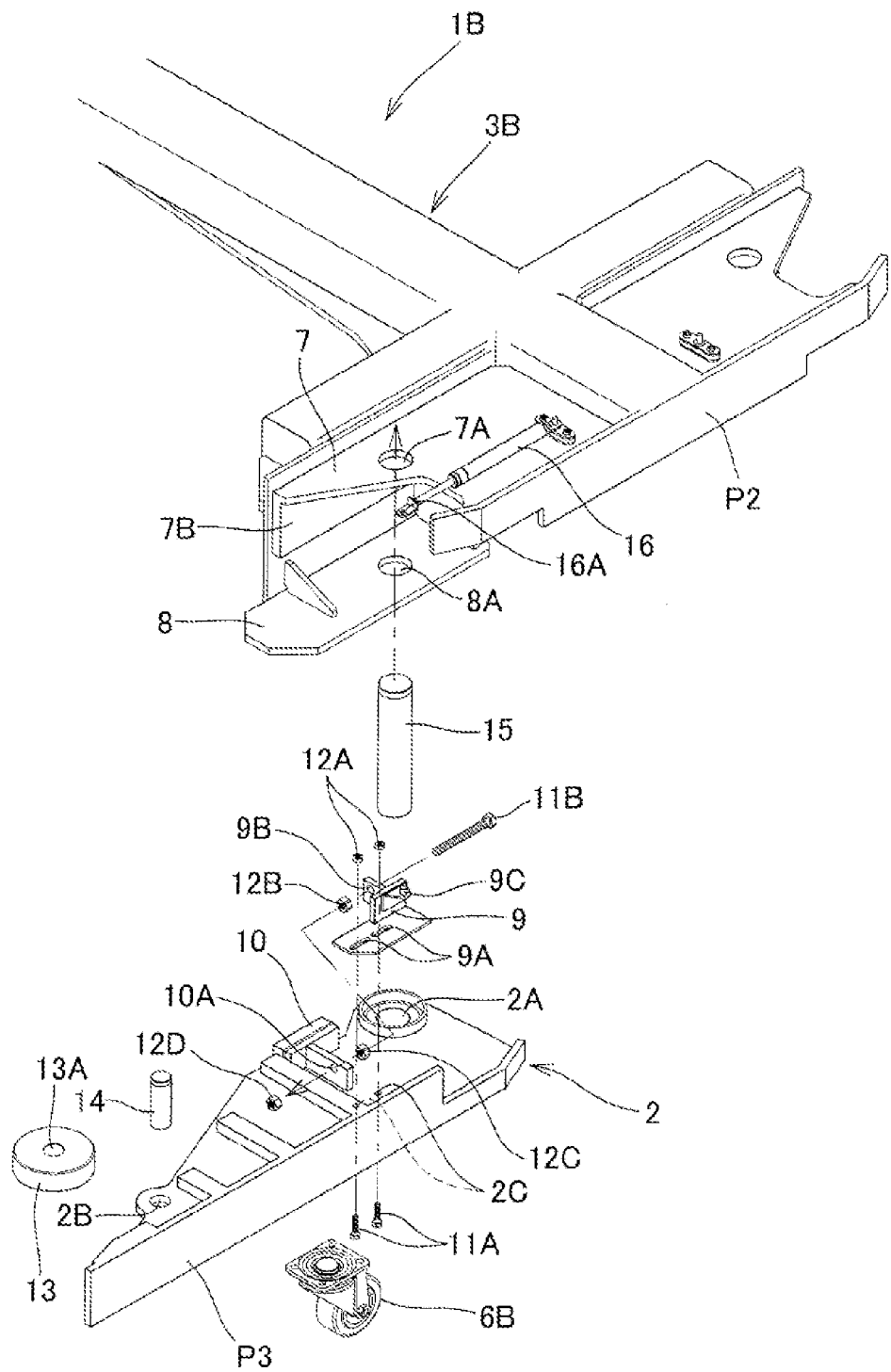
FIG. 13 is an exploded perspective view of the second truck body.

As shown in the perspective view of FIG. 10, the plan view of FIG. 11, the enlarged plan view of a main section in FIG. 12, and the exploded perspective view of FIG. 13, the oscillation pieces 2 have an approximately triangular shape in plan view (wedge shape), and are supported by the frame body 3B of the second truck body 1B so as to be capable of oscillating about a vertical shaft K. Further, when the oscillation pieces 2 are allowed to touch the side surface of the first truck body 1A adjacent on the curved route (for example, the curved route C1 in FIG. 5) by gas springs 16 as energizing units so as to oscillate, the oscillation pieces 2 are energized to a direction toward the side surface of the first truck body 1A.

That is to say, in a state that base ends of the oscillation pieces 2 are put between upper supporting plates 7 and lower supporting plates 8, support shafts 15 are inserted into through holes 8A of the lower supporting plates 8, through holes 2A at the base ends of the oscillation pieces 2 and through holes 7A of the upper supporting plates 7 so that support shaft ends are fixed. As a result, the oscillation pieces 2 are supported by the frame body 3B so as to be capable of oscillating about the support shafts 15 (the vertical shafts K), respectively.

Further, as shown in FIG. 13, bolts 11A are inserted into through holes 2C of the oscillation pieces 2 and long holes 9A of supporting members 9 from below and is screwed into a nut 12A, so that the supporting member 9 is fixed to outer right and left sides of the support shafts K at the base end of the oscillation piece 2 as shown in FIG. 12.

Further, a bolt 11B is inserted into a through hole 9B of the supporting member 9 so as to be fixed by a nut 12B, and a nut 12C is screwed into a screw shaft of the bolt 11B, so that the screw shaft is inserted into a through hole 10A of a stopper 10 fixed to the oscillation piece 2 by welding. Thereafter, a nut 12D is screwed into the screw shaft so that the supporting member 9 is connected to be fixed to the stopper 10.

Since an engagement projection 9C provided to the supporting member 9 is engaged with a front end engagement hole 16A at the rod front end of the gas spring 16, the oscillation piece 2 is energized to a direction from a position indicated by an alternate long and two short dashes line to a position indicated by a sold line in FIG. 11.

The use of the gas spring 16 can reduce a change in an energizing force with respect to displacement at a time when the oscillation piece 2 operates so as to be smaller than a change in a constitution using a coil spring.

The stopper 10 fixed to the oscillation piece 2 is allowed to touch a touch stop portion 7B below the upper supporting plate 7 in FIG. 13 on positions indicated by solid lines in FIG. 10 and FIG. 11.

Further, in a state that a horizontal roller 13 is inserted between the horizontal plates above and below the oscillation piece 2, a support shaft 14 is inserted into the through hole 2B of the horizontal plate and a through hole 13A of the horizontal roller and the support shaft end is fixed, so that the horizontal roller 13 is mounted to the front end (free end) of the oscillation piece 2.

For example, when the conveyance truck group G is conveyed along a route including the curved route C1 and the linear route shown in FIG. 5 (for example, the first work line L1 in FIG. 1), as shown in FIG. 3, a side surface P1 of the first truck body 1A and a side surface P2 of the second truck body 1B including side surfaces P3 of the oscillation pieces 2 form an approximately linear shape in the conveyance truck 1 that is moving along the linear route. In this state, the horizontal roller 13 does not touch the other parts, and while the oscillation pieces 2 are being energized by the gas springs 16, the oscillation pieces 2 keep their positions in a state that the stoppers 10 are touched by the touch stop portions 7B. For this reason, the side surface P1, P2, and P3 of the linear shape can be a continuous surface D to be driven that is driven by the friction type drive unit.

Further, in a case where the conveyance truck 1 is moving on the curved route C1 in FIG. 5, since the horizontal rollers 13 of the oscillation pieces 2 touch the adjacent truck body, namely, the side surface P1 of the first truck body 1A (see also FIG. 14) so as to roll along the side surface P1, as shown by the alternate long and two short dashes line in FIG. 11 or FIG. 12, the oscillation pieces 2 oscillate about the vertical shafts K against the emerging forces of the gas springs 16, and the horizontal rollers 13 are kept to be pressed against the side surface P1 of the first truck body 1A.

The driving of the conveyance truck 1 by the friction type drive unit disposed on the curved route is described below.

Figure 14:
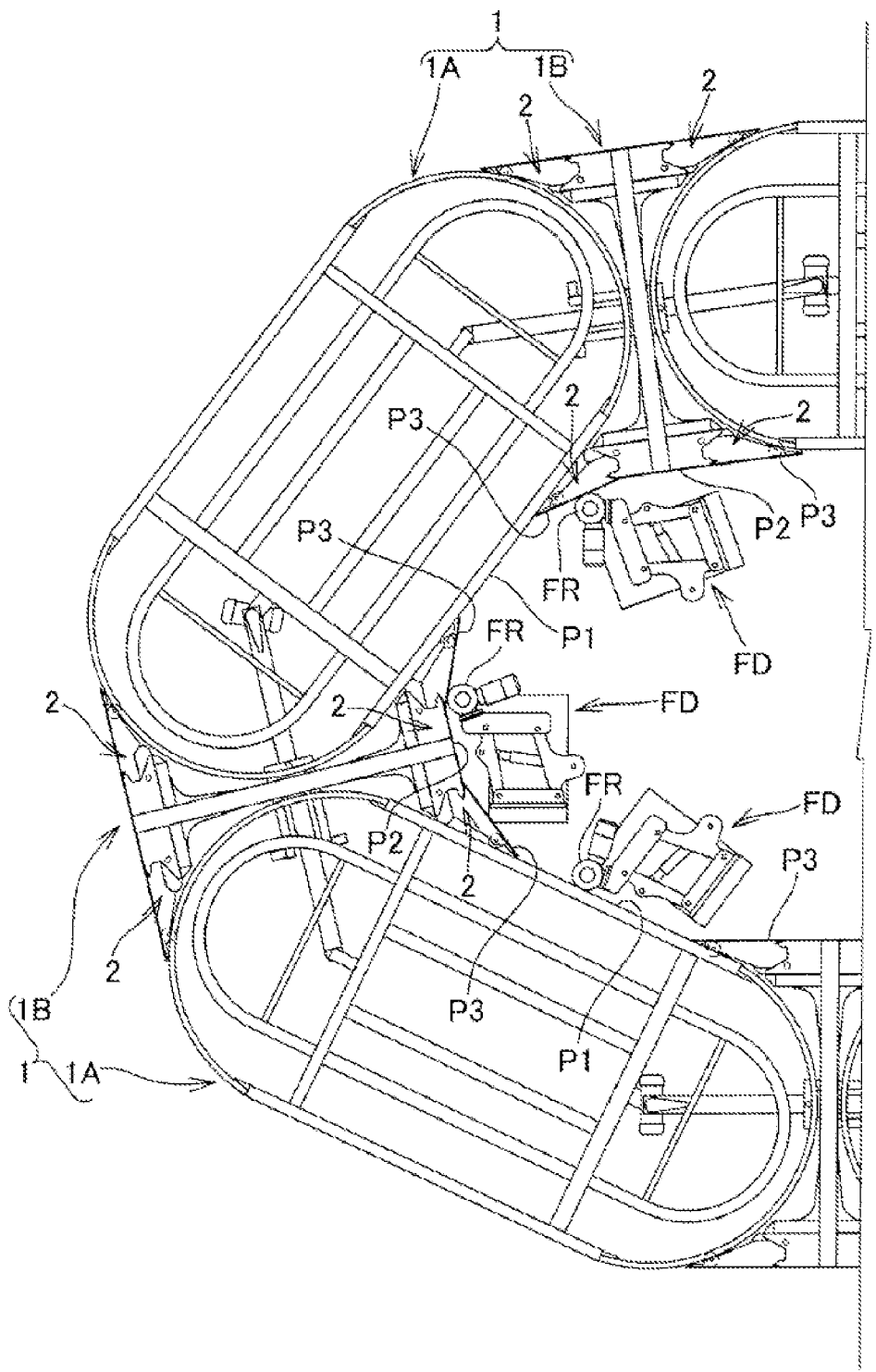
FIG. 14 is a plan view illustrating a state that the conveyance truck is conveyed by a friction-type drive unit disposed on the curved route.
Figure 15:
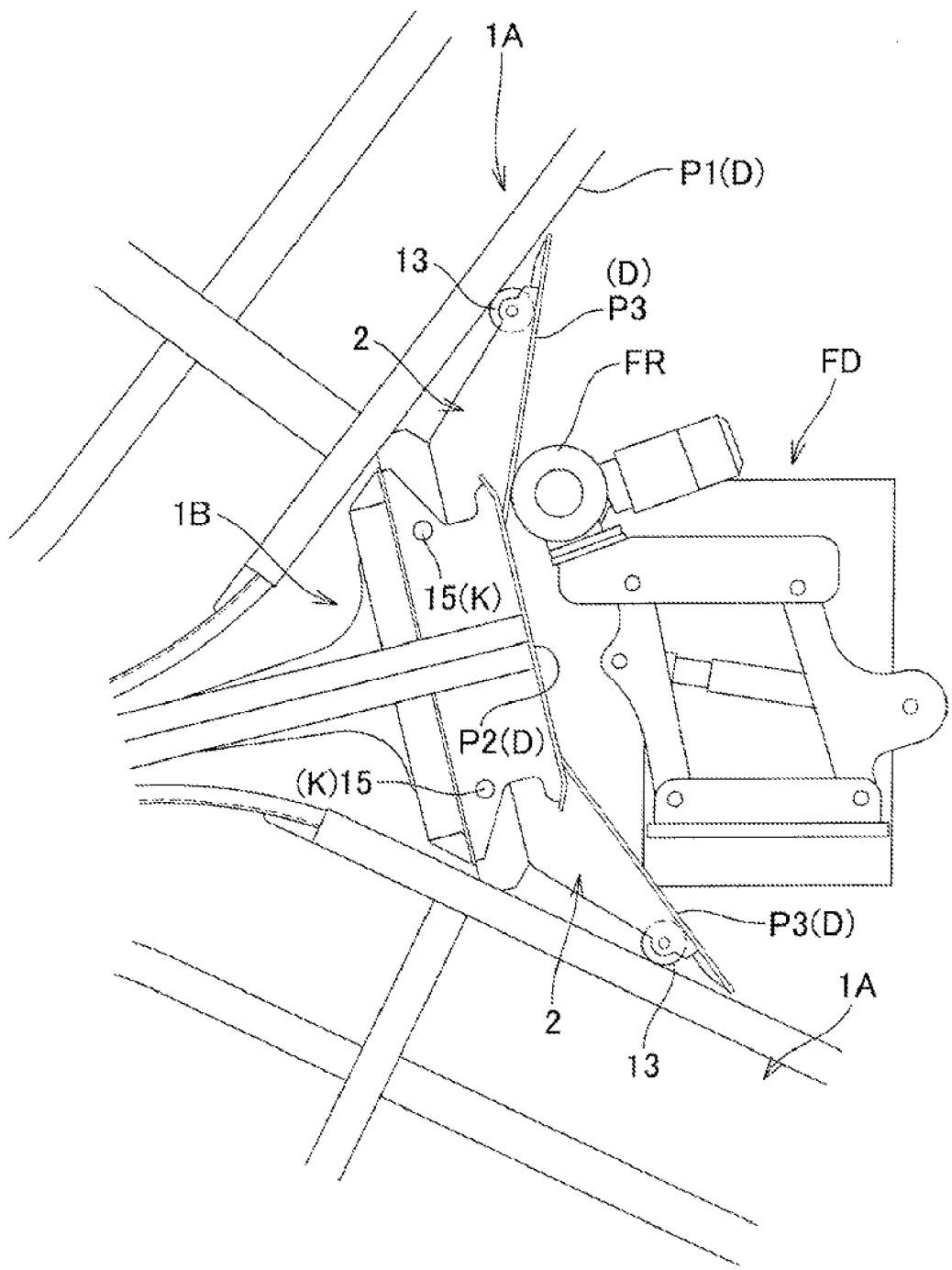
FIG. 15 is a main section enlarged plan view of the same state.

As shown in the plan view of FIG. 14 and the enlarged plan view of a main section in FIG. 15, when the friction type drive unit FD is disposed on an inner radial side of the curved route, the friction roller FR touches the surface D to be driven composed of the side surface P1 of the first truck body 1A and the side surface P2 of the second truck body 1B including the side surfaces P3 of the oscillation pieces 2.

Figure 16:
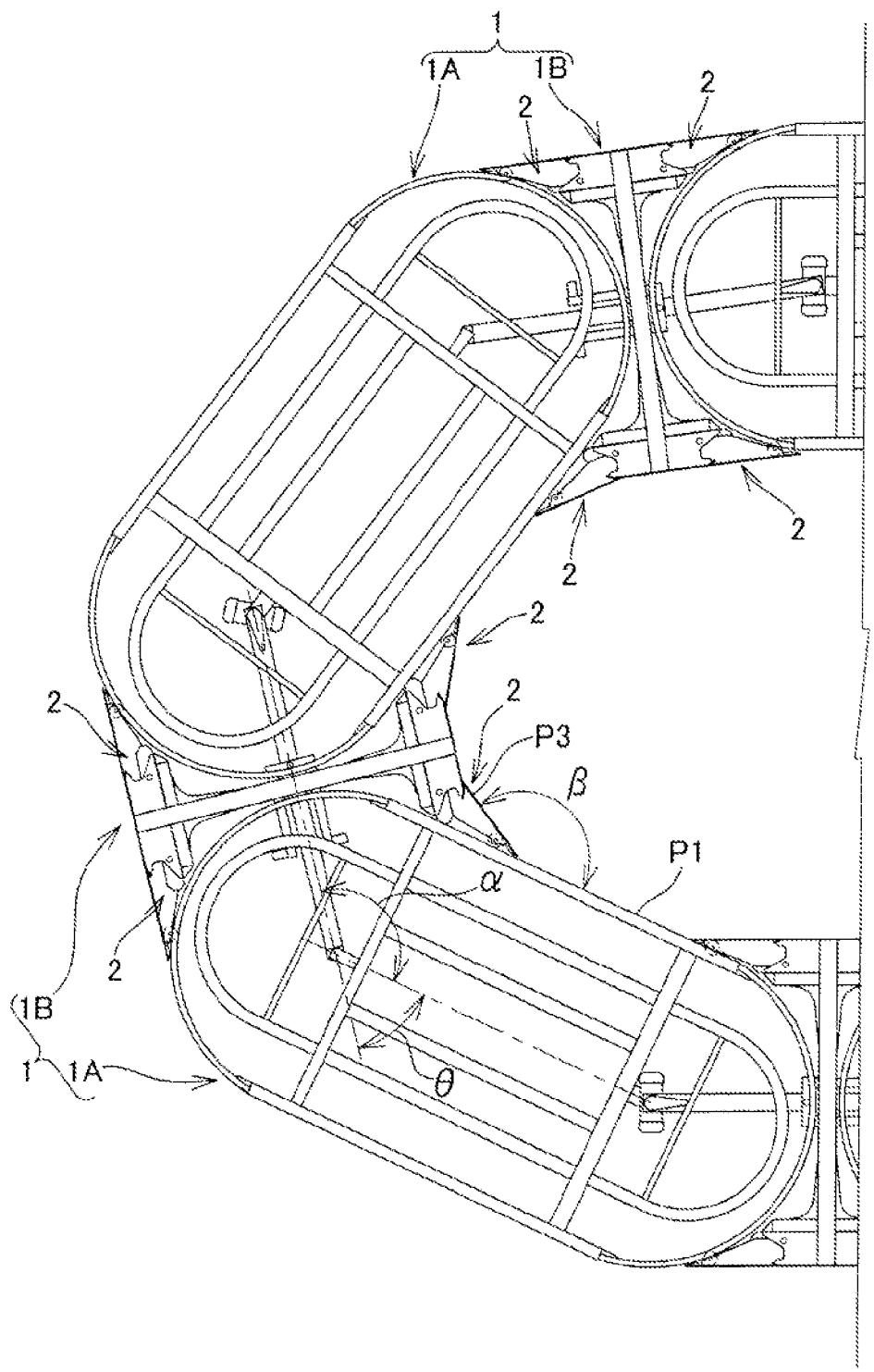
FIG. 16 is a plan view illustrating a curvature angle θ between the first truck body and the second truck body, an angle α between the first truck body and the second truck body, and an angle β between side surfaces of mobile bodies and the side surface of the adjacent truck body.

As shown in the plan view of FIG. 16, when the curvature angle of the first truck body 1A and the second truck body 1B is denoted by θ, an angle α between the first truck body 1A and the second truck body 1B becomes Π−θ. An angle β between the side surface P3 of the oscillation piece 2 as the mobile body and the side surface P1 of the first truck body 1A as the adjacent truck body is larger than the angle α (β>α) because the oscillation piece 2 touches the side surface P1 of the first truck body 1A and operates (oscillates).

Therefore, even when the curvature radius of the curved route is reduced and the curvature angle θ between the first truck body 1A and the second truck body 1B becomes large, the angle β between the side surface P3 of the oscillation piece 2 and the side surface P1 of the first truck body 1A on the curved route is larger than the angle α (α=Π−θ) between the first truck body 1A and the second truck body 1B. For this reason, since a change in the angle of the surface D to be driven to be touched by the friction roller FR becomes comparatively smooth, a phenomenon that pushing-out of the truck by the friction roller FR is disabled is not caused, and the driving by the friction type drive unit FD provided to the curved route becomes more stable and more secure.

A constitutional example of the connecting device C is described below.

Figure 17:
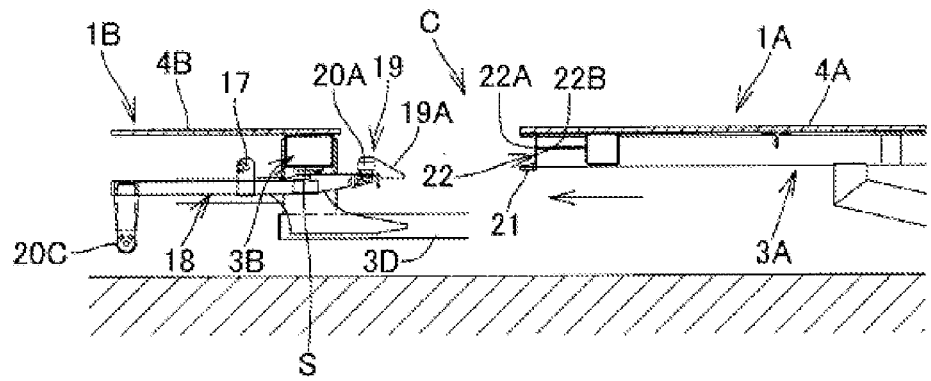
FIGS. 17(a) to 17(c) are vertical sectional front views for describing an operation of a connecting device for connecting a conveyance truck (following truck) that approaches a conveyance truck (preceding truck) at an end of the conveyance truck group from a rear side.
Figure 17:
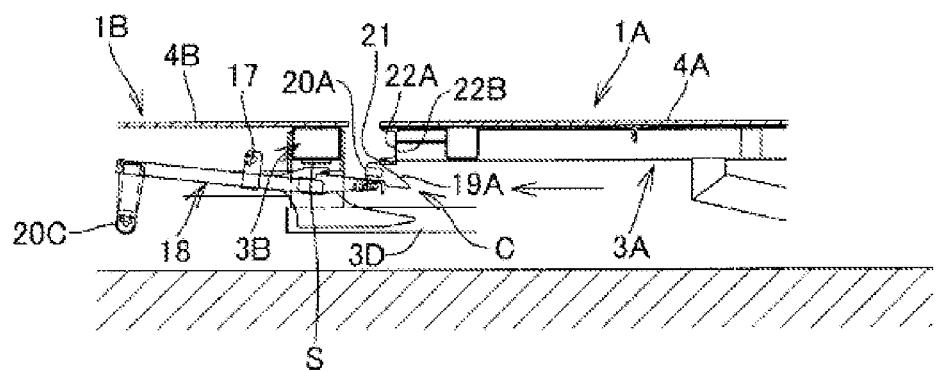
Figure 17:
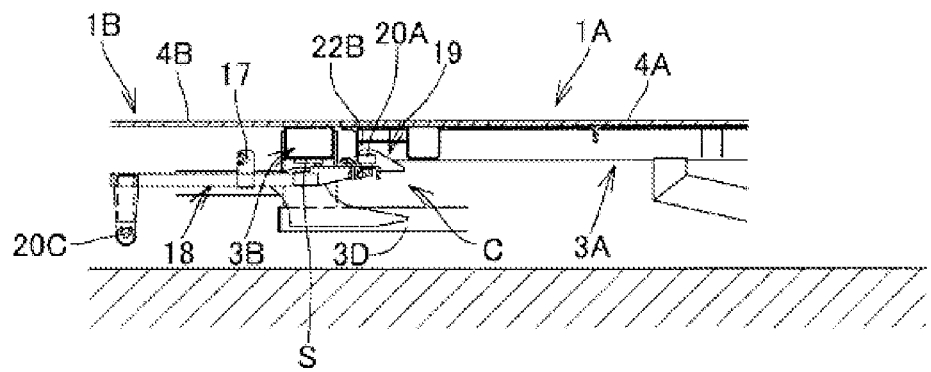
Figure 18:
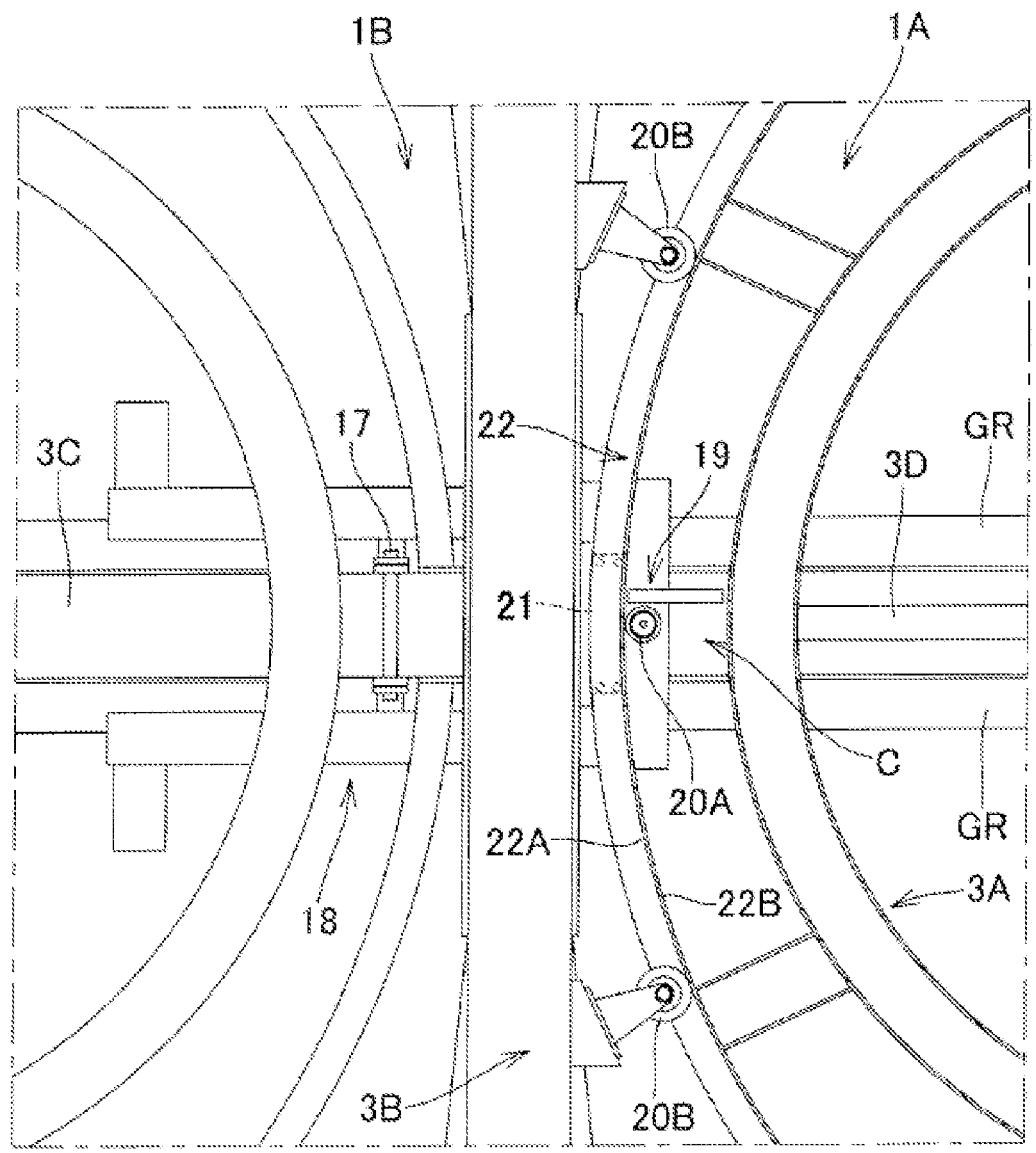
FIG. 18 is a plan view illustrating a state that the connection is completed by the connecting device and the upper surface plate is removed.

As shown in the perspective view of FIG. 10, the plan view of FIG. 11, the vertical sectional front views for describing the operation in FIGS. 17(a) to 17(c), and the plan view of FIG. 18, the connecting device C connects and disconnects the conveyance trucks 1 on the front and rear positions by means of the oscillation of oscillation arm 18 that oscillates about a horizontal shaft 17 in the horizontal direction provided to the second truck body 1B of the conveyance truck 1.

As shown in FIG. 10 and FIG. 11, a piece 19 to be operated and a horizontal roller 20A are provided to a rear end of the oscillation arm 18 on the connecting side, and rollers 20C to be operated to be operated when the connection by the connecting device C is released is mounted to a front end of the oscillation arm 18 on a connecting side.

The oscillation arm 18 is formed so that center of gravity is positioned on its front side with respect to the horizontal shaft 17. Therefore, when the piece 19 to be operated and the rollers 20C to be operated are not operated, as shown in FIGS. 17(a) and 17(c), a portion of the oscillation arm 18 on a rear side with respect to the horizontal shaft 17 touches a stopper S on a lower surface of the frame body 3B to stop in an approximately horizontal state.

Further, right and left horizontal rollers 20B are mounted to the frame body 3B of the second truck body 1B.

Further, as shown in FIGS. 17(a) to 17(c) and FIG. 18, an arc-shaped plate member 22 in plan view whose arc center G1 is the same as the arc center of the arc-shaped projection A1 and the arc-shaped recess B2 (see FIG. 3) on the connecting portion of the conveyance trucks 1 is provided to a front end of the first truck body 1A on the connecting side.

Therefore, in the state that the conveyance trucks 1 are connected to each other by the connecting device C shown in FIG. 17(c) and FIG. 18, since the horizontal rollers 20B and 20A touch a front surface 22A and a rear surface 22B of the arc-shaped plate member 22 in plan view, the conveyance trucks 1 are prevented from being separated.

An operation of the connecting device C is described below with reference to FIGS. 17(a) to 17(c).

In a state that a following truck approaches a preceding truck as shown in FIG. 17(a), the oscillation arm 18 remains still in the approximately horizontal state.

In this state, when the following truck further approaches the preceding truck and an operating unit 21 touches a slant 19A of the piece 19 to be operated on the rear end of the oscillation arm 18 as shown in FIG. 17(b), the oscillation arm 18 is pushed by the operating unit 21 so as to oscillate with its front part being up.

When the following truck further approaches the preceding truck as shown in FIG. 17(c), the piece 19 to be operated and the horizontal roller 20A are positioned on a rear side of an arc-shaped plate member 22 (see FIG. 17(a) and FIG. 18), and the operating unit 21 is detached form the piece 19 to be operated. For this reason, the oscillation arm 18 returns to the approximately horizontal state, and thus the front and rear conveyance trucks 1 are connected to each other.

The front and rear conveyance trucks 1 connected by the connecting device C are separated by pushing up the rollers 20C to be operated on a cam rail disposed on a predetermined position of the conveyance route.

That is to say, since the oscillation arm 18 whose rollers 20C to be operated are pushed up on the cam rail tilts with its front part being up, the piece 19 to be operated and the horizontal roller 20A descend. For this reason, the preceding conveyance truck 1 is sent fast in the state that the front and rear conveyance trucks 1 are disconnected, so that the front and rear conveyance trucks 1 are separated.

According to such a constitution of the connecting device C, the conveyance trucks 1 on the front and rear positions are connected and disconnected by the oscillation of the oscillation arm 18 to oscillate about the horizontal shaft 17 of the horizontal direction provided to the conveyance truck 1. For this reason, the constitution is simple, so that the manufacturing cost can be reduced, the operation reliability is high, and the connecting and disconnecting operations become easy.

Further, in the state that the front and rear conveyance trucks 1 are connected by the connecting device C, the horizontal rollers 20B and 20A touch the front surface 22A and the rear surface 22B of the arc-shaped plate member 22, and the front and rear conveyance trucks 1 are prevented from being separated, so that the curvature of the front and rear conveyance trucks 1 connected to each other by the connecting device C on the curved route is smooth.

In the conveyance device having the such a constitution, the conveyance truck 1 is composed of the two truck bodies (the first truck body 1A and the second truck body 1B) connected so as to be capable of curving in the horizontal direction, the conveyance truck 1 can be formed largely in the front-rear direction and the widthwise direction. For this reason, even when the conveyance truck 1 is loaded with the large conveyance object W such as an automobile, a working space where a worker rides and does the works can be secured on the truck 1 in a lengthwise direction and the widthwise direction of the conveyance object W, and a space into which the elevating device E is incorporated can be secured.

Further, the plurality of conveyance trucks 1 whose upper surfaces are approximately horizontal surfaces is connected by the connecting device C so as to be capable of forming the conveyance truck group G. For this reason, the upper surface of the conveyance truck group G can be the continuous working floor F on which the worker does the installation works, and the conveyance truck group G can be disposed on the conveyance route including the curved route, so that working efficiency and space efficiency can be improved.

Further, since the portions that form the arc-shaped recesses B1 and B2 of the second truck body 1B and are radially inside the curved route are the oscillation pieces 2 as the mobile bodies, the side surface P1 of the first truck body 1A and the side surface P2 of the second truck body 1B including the side surfaces P3 of the oscillation pieces 2 form the approximately linear shape on the linear route, and the oscillation pieces 2 touch the side surface P1 of the first truck body 1A to operate on the curved route. For this reason, since front and rear ends on the inner side do not have to be removed in order to avoid interference on the curved route (cut-away portions do not have to be provided), eaves-shaped covers for covering the gaps, the recesses and the projections do not have to be provided to the linear route or the curved route, or sizes of the eaves-shaped covers CV1 and CV2 can be minimized. Therefore, since a decrease in the floor area of the upper surfaces of the trucks 1 where the worker rides is minimum, workability can be improved and manufacturing cost can be reduced.

Further, the side surface P1 of the first truck body 1A and the side surface P2 of the second truck body 1B including the side surfaces P3 of the oscillation pieces 2 form the approximately linear shape on the linear route, and the oscillation pieces 2 touch the side surface P1 of the first truck body 1A to operate on the curved route. For this reason, since the front and rear ends on the inner side do not have to be removed in order to avoid the interference on the curved route (the cut-away portions do not have to be provided), a large gap is not generated on the side surfaces of the first truck body 1A and the second truck body 1B on the linear route.

Therefore, since a step is not formed the side surface P1 of the first truck body 1A and the side surface P2 of the second truck body 1B including the side surfaces P3 of the oscillation pieces 2 on the linear route, the friction type drive unit FD can be provided to the linear route. Further, even when the friction roller FR of the friction type drive unit FD is allowed to touch the side surfaces P1, P2, and P3 as the surface D to be driven, stable friction driving can be performed, and abrasion and breakage of the friction roller FR is not caused.

Further, the oscillation pieces 2 touch the side surface P1 the first truck body 1A to operate on the curved route, and recesses and projects are not generated on an inner surface of the conveyance truck 1 in a curvature radial direction on the curved route. For this reason, the friction type drive unit FD can be provided to the curved route. Even when the friction roller FR of the friction type drive unit FD is allowed to touch the side surfaces P1, P2, and P3 as the surface D to be driven, stable friction driving can be performed, and abrasion and breakage of the friction roller FR are not caused.

Further, since the surface D to be driven to be touched by the friction roller FR can be driven by the friction type drive unit FD on the linear route and the curved route with the surface D to be driven being the side surface of the conveyance truck 1, the height of the conveyance truck 1 can be further lowered, and the drive unit can be shared and the structure of the truck can be simplified.

Further, the mobile bodies are the oscillation pieces 2 capable of oscillating about the vertical shaft K, and the gas spring 16 for energizing the oscillation pieces 2 in a direction approaching the side surface P1 of the first truck body 1A when the oscillation pieces 2 touch the side surface P1 of the first truck body 1A on the curved route to oscillate is provided. For this reason, the manufacturing cost can be reduced because the constitution of the mobile bodies is simple. Since the gas spring 16 for emerging the oscillation pieces 2 that is such a simple mechanism to a predetermined direction is provided, the oscillation pieces 2 are not opened sideways due to impact and oscillation at the time when the truck is conveyed, and thus the operation of the oscillation pieces 2 becomes stable and secure.

The above description refers to the case where the mobile bodies are the oscillation pieces 2 that can oscillate about the vertical shaft K, but the mobile bodies may be formed so that at the portions that form the arc-shaped recesses B1 and B2 in plan view of the second truck body 1B and are radially inside the curved route, the side surfaces of the first truck body 1A and the second truck body 1B are approximately linear on the linear route and the mobile bodies touch the side surface P1 of the first truck body 1A to operate on the curved route.

That is to say, the mobile bodies may touch the side surface of the adjacent truck body on the curved route so as to be elastically deformed with the portions that form the arc-shaped recesses in plan view and are radially inside the curved route being an elastic bodies such as plate spring or rubber, or may be contact with the side surface of the adjacent truck body so as to slide on the curved route with the portion being slidably configured.

Further, as shown in FIG. 3, the above description refers to the case where the conveyance truck 1 is composed of the first truck body 1A whose front and rear end surfaces are the arc-shaped projections A1 and A2 in plan view and the second truck body 1B whose front and rear end surfaces are the arc-shaped recesses B1 and B2 in plan view. However, the conveyance truck 1 may be as shown in the plan view of FIGS. 19(a) and 19(b), composed of the first truck body 1A whose front end surface is an arc-shaped projection A3 in plan view and whose rear end surface is an arc-shaped recess B3 in plan view, and the second truck body 1B whose front end surface is an arc-shaped projection A4 in plan view and whose rear end surface is an arc-shaped recess B4 in plan view.

Figure 19A:
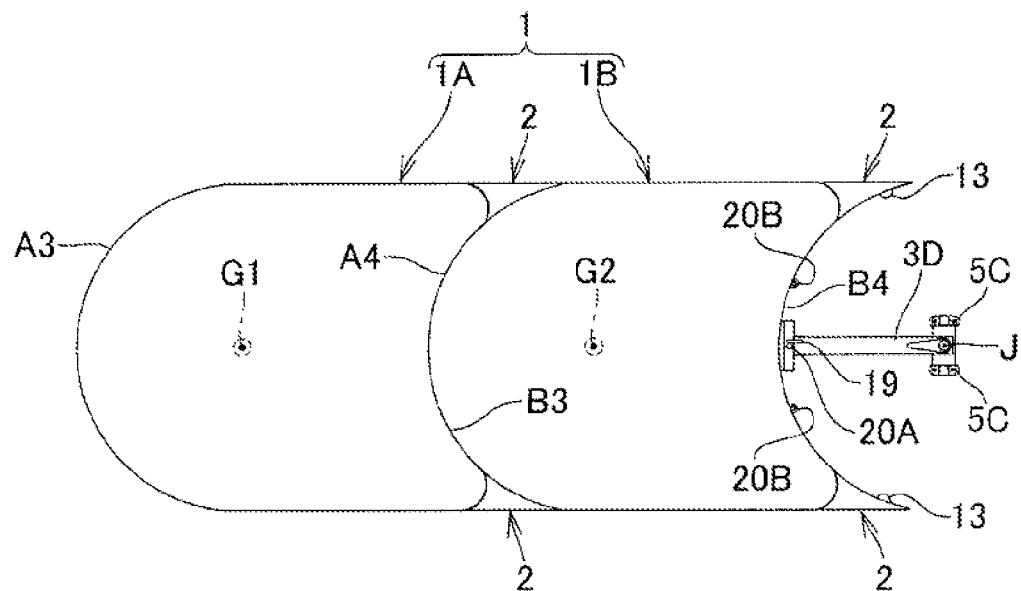
FIGS. 19(a) and 19(b) are plan views illustrating modified examples of the conveyance truck where front end surfaces of the first truck body and the second truck body are arc-shaped projections in plan view, and rear end surfaces of the first truck body and the second truck body are arc-shaped recesses in planar view.
Figure 19B:
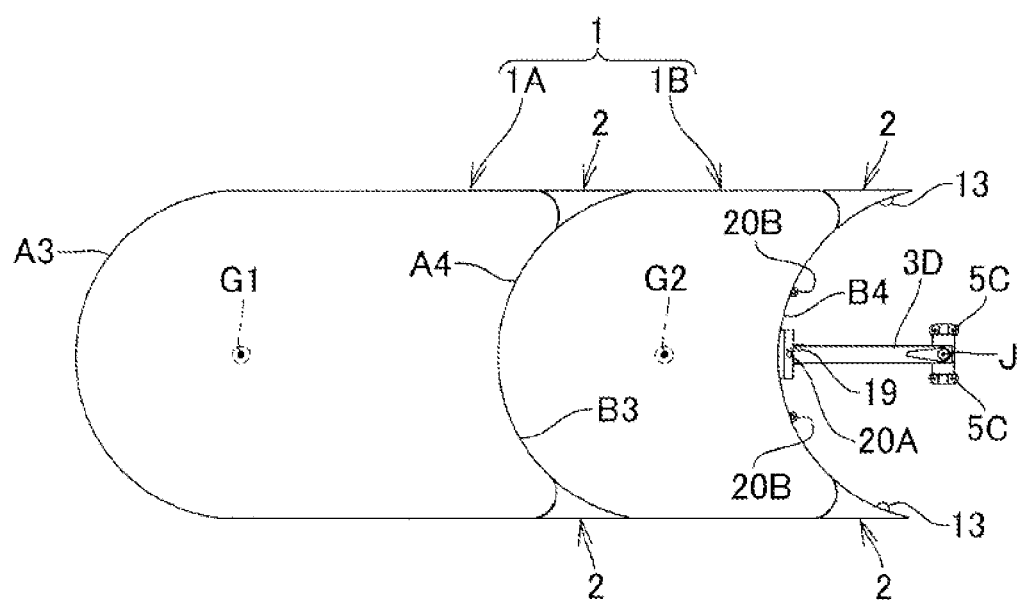
Figure 20:
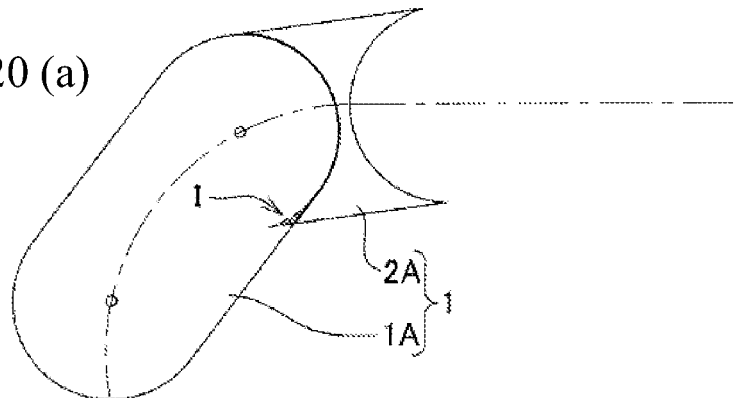
FIGS. 20(a) to 20(c) are schematically plan views illustrating conventional examples where two truck bodies (1A and 1B) compose a conveyance truck 1, and the truck body 1A is formed largely in a front-rear direction and a widthwise direction.
Figure 20:
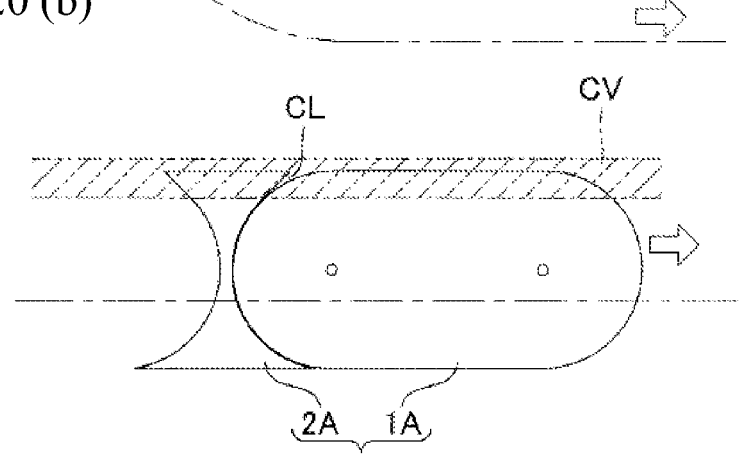
Figure 20:
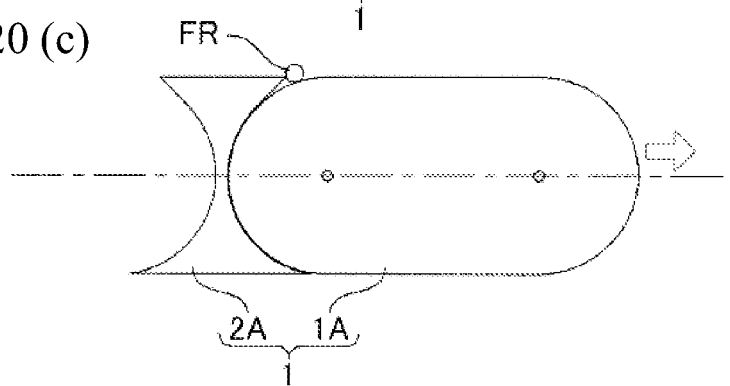

In FIGS. 19(a) and 19(b), the same reference symbols as those in FIG. 3 denote identical or corresponding parts, FIG. 19(a) illustrates a case where the first truck body 1A and the second truck body 1B have the same size, and FIG. 19(b) illustrates a case where the first truck body 1A is larger than the second truck body 1B.

Further, in the conveyance truck 1 shown in FIGS. 19(a) and 19(b), a conveyance object is supported by one or both of the first truck body 1A and the second truck body 1B.

Further, the above description refers to the case where the continuous working floor (a working plane) F on which the worker rides and does the works is formed on the conveyance trucks 1, but the conveyance device of the present invention can be applied also to a conveyance route where the working steps do not exist and only conveyance is performed. When the conveyance device of the present invention is used in the conveyance route where only conveyance is performed, not the continuous working floor where the worker rides and does the works but a continuous floor is formed on the conveyance trucks 1 where the worker or the like can ride and cross the conveyance route, for example.

REFERENCE SIGNS LIST

1 Conveyance truck
1A First truck body
1B Second truck body
2 Oscillation piece (mobile body)
2A, 2B, 2C Through hole
3A, 3B Frame body
3C Connecting rod
3D Guide rod 4A, 4B Upper surface plate
5A, 5B, 5C Horizontal guide roller
6A, 6B Traveling wheel
7 Upper supporting plate
7A Through hole
7B Touch stop portion
8 Lower supporting plate
8A Through hole
9 Supporting member
9A Through hole
9B Long hole
9C Engagement projection
10 Stopper
10A Through hole
11A, 11B Bolt
12A, 12B, 12C, 12D Nut
13 Horizontal roller
13A Through hole
14, 15 Support shaft
16 Gas springs (Energizing unit)
16A Front end engagement hole
17 Horizontal shaft
18 Oscillation arm
19 Piece to be operated
19A Slant
20A, 20B Horizontal roller
20C Rollers to be operated
21 Operating unit
22 Arc-shaped plate member
22A Front surface
22B Rear surface
A1, A2, A3, A4 Arc-shaped projection
B Braking unit (friction type drive unit)
B1, B2, B3, B4 Arc-shaped recess
C Connecting device
C1, C2, C3 Curved route
CL Gap
CV, CV1, CV2 Cover
D Surface to be driven
E Elevating device
F Working floor (continuous floor)
FD Friction type drive unit
FR Friction roller
FS Floor
G Conveyance truck group
G1, G2 Arc center
GR Guide rail
H High-speed driving unit (friction type drive unit)
H/L High-speed/low-speed driving unit (friction type drive unit)
I Interference portion
J, K Vertical shaft
L Low-speed driving unit (friction type drive unit)
L1 Trim line (first work line)
L2 Chassis line (second work line)
L3 Final line (third work line)
M, N, O Gap
P1, P2, P3 Side surface
R Traveling rail
S Stopper
ST1 Loading station
ST2 Unloading station
T1, T2 Conveyance line between work lines
T3 Empty truck return line
W Conveyance object
α Angle between first truck body and second truck body
β Angle between side surface of mobile body and side surface of adjacent truck body
θ Curvature angle between first truck body and second truck body

The invention claimed is:
1. A conveyance device for conveying a non-self-propelled conveyance truck loaded with a conveyance object along a conveyance route including a curved route and allowing a floor continuous with the conveyance truck to be formed on an entire or a part of the conveyance route, the conveyance device comprising:
a guide rail for guiding the conveyance truck along the conveyance route, the guide rail being constructed along the conveyance route;
a friction type drive unit that has a friction roller to touch a surface to be driven of the conveyance truck; and
a connecting device for connecting the conveyance trucks on front and rear positions,
wherein the conveyance truck is configured so that
a first truck body whose both front and rear end surfaces are arc-shaped projections in plan view is connected to a second truck body whose both front and rear end surfaces are arc-shaped recesses in plan view to be capable of curving at arc centers of one of the arc-shaped projections of the first truck body and one of arc-shaped recesses of the second truck body in a horizontal direction with that one of the arc-shaped projections of the first truck body being opposed to that one of the arc-shaped recesses of the second truck body, upper surfaces of the first truck body and the second truck body are approximately horizontal surfaces, and the first truck body supports the conveyance object, or
the first truck body one of whose front and rear end surfaces is an arc-shaped projection in plan view and other one of whose front and rear end surfaces is an arc-shaped recess in plan view is connected to the second truck body one of whose front and rear end surfaces is an arc-shaped projection in plan view and other one of whose front and rear end surfaces is an arc-shaped recess in plan view to be capable of curving at arc centers of the arc-shaped recess of the first truck body and the arc-shaped projection of the second truck body in the horizontal direction with the arc-shaped recess of the first truck body being opposed to the arc-shaped projection of the second truck body, the upper surfaces of the first truck body and the second truck body are approximately horizontal surfaces, and the conveyance object is supported by the first truck body or the second truck body, or the first truck body and the second truck body,
portions of the second truck body or portions of the first truck body and the second truck body radially inside the curved route forming the arc-shaped recesses are composed of mobile bodies that make side surfaces of the first truck body and the second truck body approximately linear on a linear route and touch the side surface of the adjacent truck body to move on the curved route.
2. The conveyance device according to claim 1, wherein the side surfaces of the first truck body and the second truck body including side surfaces of the mobile bodies are the surface to be driven to be touched by the friction roller, and an angle between the side surface of the mobile body and the side surface of the adjacent truck body on the curved route is larger than an angle between the first truck body and the second truck body.

3. The conveyance device according to claim 2, wherein the mobile bodies are oscillation pieces capable of oscillating about a vertical shaft, the device comprising an energizing unit for energizing the oscillation pieces to a direction approaching the side surface of the truck body when the oscillation pieces touch the side surface of the adjacent truck body to oscillate on the curved route.

4. The conveyance device according to claim 1, wherein the connecting device connects and disconnects the conveyance trucks on front and rear positions through oscillation of an oscillation arm provided to the conveyance truck and oscillating about a horizontal support shaft in the horizontal direction, and in a state that the conveyance trucks are connected by the connecting device, horizontal rollers touch a front surface and a rear surface of an arc-shaped plate member in plan view whose arc center is identical to arc centers of the arc-shaped projections and the arc-shaped recesses at connecting portions of the conveyance trucks so that the conveyance trucks are prevented from being separated, horizontal guide rollers to be guided by the guide rail from outer right and left sides are provided to the arc centers of the two arc-shaped projections at the conveyance truck, respectively, and right and left horizontal guide rollers to be guided by the guide rail from inner right and left sides are mounted to either side of the horizontal guide roller, that is connected to another conveyance truck by the connecting device, on a side of the connecting portion of the another conveyance truck at a front end of a guide rod extended toward the another conveyance truck connected from the second truck body.

\* \* \* \* \*